(12) United States Patent
Yamada

(10) Patent No.: US 8,427,761 B2
(45) Date of Patent: Apr. 23, 2013

(54) IMAGE PICKUP OPTICAL SYSTEM, IMAGE PICKUP OPTICAL DEVICE, AND DIGITAL EQUIPMENT

(75) Inventor: Keiko Yamada, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/255,222

(22) PCT Filed: Mar. 1, 2010

(86) PCT No.: PCT/JP2010/053232
§ 371 (c)(1),
(2), (4) Date: Sep. 7, 2011

(87) PCT Pub. No.: WO2010/103948
PCT Pub. Date: Sep. 16, 2010

(65) Prior Publication Data
US 2012/0026384 A1   Feb. 2, 2012

(30) Foreign Application Priority Data

Mar. 10, 2009   (JP) ................. 2009-055923

(51) Int. Cl.
*G02B 17/00*   (2006.01)
*G02B 15/14*   (2006.01)
*G02B 13/04*   (2006.01)

(52) U.S. Cl.
USPC ............. 359/726; 359/678; 359/753

(58) Field of Classification Search .......... 359/726, 359/678, 753
See application file for complete search history.

(56) References Cited

U.S. PATENT DOCUMENTS 4,844,601 A * 7/1989 Hilbert et al. ............ 359/747
7,283,309 B2 * 10/2007 Caldwell et al. .......... 359/676

FOREIGN PATENT DOCUMENTS

| JP | 2003-202500 | 7/2003 |
| JP | 2005-292763 | 10/2005 |
| JP | 2006-58840 | 3/2006 |
| JP | 2007-33819 | 2/2007 |
| JP | 2007-133096 | 5/2007 |

* cited by examiner

*Primary Examiner* — Scott J Sugarman
(74) *Attorney, Agent, or Firm* — Cozen O'Connor

(57) ABSTRACT

An image pickup optical system OP includes first and second prisms P1, P2 for bending incident light at an almost right angle. Optical axis AX at the incident surface of first prism P1 and optical axis AX at the outgoing surface of second prism P2 are almost parallel with each other. There is a lens element forming at least one power group on the optical path between first and second prisms P1, P2, wherein a power group closest to the incident surface of second prism P2 is a positive power group. The incident surface of second prism P2 has a concaved surface shape facing the object side, and the following conditional expressions are satisfied: $-4.2 < fp2/f < -0.2$ (fp2: a focal length of the second prism, f: is a focal length of the entire image pickup optical system), and $0.2 < |f\_1p/fp2| < 1.5$ (f_1p: a focal length of the power group closest to the incident surface of the second prism).

15 Claims, 19 Drawing Sheets

IMAGE PICKUP OPTICAL SYSTEM, IMAGE PICKUP OPTICAL DEVICE, AND DIGITAL EQUIPMENT

RELATED APPLICATIONS

This application is a U.S. National Phase Application under 35 USC 371 of International Application PCT/JP2010/053232 filed Mar. 1, 2010.

This application claims the priority of Japanese application No. 2009-055923 filed Mar. 10, 2009, the entire content of which is hereby incorporated by reference.

TECHNICAL FIELD

The present invention relates to an image pickup optical system, image pickup optical device and digital equipment. More specifically, the present invention relates to an image pickup optical device which picks up an image of a subject with an image pickup element, a digital equipment with an image input function on which the image pickup device is mounted, and an image pickup optical system which forms an optical image of a subject on a light-receiving surface of an image pickup element.

BACKGROUND ART

In recent years, there has been a remarkable spread of digital equipments with an image input function such as a digital still camera, a digital video camera, a mobile phone with a camera and a personal digital assistant (PDA: Personal Digital Assistant) with a camera, and increase of the number of pixels and enhancement of performance of an image pickup element to be mounted on those equipments, have been advancing rapidly. Therefore, in order to take full advantage of the performance of an image pickup element with increased number of pixels, high optical performance is required also for an image pickup optical system which guides an optical image of a subject onto an image pickup element. Further, since portability is required in the above digital equipments, small-sizing of the equipments is also needed.

As a way to small-sizing a digital equipment, it can be considered to make an image pickup optical system compact. As a way to making an image pickup optical system compact, there has been conventionally known a reflection prism. For example, Patent Literature 1 proposes a structure that one reflection prism for bending an optical path is arranged in an optical path of an image pickup optical system. Further, Patent Literature 2 proposes a structure that two reflection prisms for bending an optical path is arranged in an optical path of an image pickup optical system.

CITATION LIST

Patent Literature
  Patent Literature 1: JP-A No. 2003-202500
  Patent Literature 2: JP-A No. 2006-58840

SUMMARY OF INVENTION

Technical Problem

In the structure that one reflection prism is used as proposed in Patent Literature 1, the thickness of the whole optical structure is defined by the size of an image pickup element. Therefore, it causes a problem that an increase of the size of an image pickup element brings an increase of the thickness of the whole optical structure.

In the structure that two reflection prisms are used as proposed in Patent Literature 2, the optical path is bent twice. It can solve the problem that the increase of the size of an image pickup element brings the increase of the thickness of the whole optical structure. Further, because an incident surface and outgoing surface of the reflection prisms have power, aberration caused in the image pickup optical system can be corrected. However, in the structure disclosed in Patent Literature 2, the reflection prism arranged at the image side is large in size, and the thickness of the whole optical structure is insufficiently decreased. Further, there is no description about correction of aberrations which becomes remarkable in an optical system employing a prism, such as astigmatism and chromatic aberration which are required for ensuring properties of the image pickup optical system, in Patent Literature 2. Therefore, it is difficult that the optical structure disclosed in Patent Literature 2 copes with an image pickup element with the increased number of pixels.

The present invention has been achieved in view of the above condition, and is aimed to provide an image pickup optical system which has high optical performance capable of coping with an image pickup element with the increased number of pixels and can achieve the reduced thickness of the whole optical structure, and to provide an image pickup optical device and a digital equipment on which the image pickup optical system is mounted.

Solution to Problem

To achieve the above object, an image pickup optical system of the first aspect of the present invention is an image pickup optical system for forming an optical image of an object onto a light-receiving surface of an image pickup element. The image pickup optical system is characterized by comprising: two reflection prisms for bending incident light at an almost right angle, wherein when a reflection prism located at an object side along an optical path is a first prism and a reflection prism located at an image side along the optical path is a second prism, an optical axis at an incident surface of the first prism and the optical axis at an outgoing surface of the second prism are almost parallel with each other; and comprising a lens element forming at least one power group on an optical path between the two reflection prisms, wherein a power group closest to an incident surface of the second prism is a positive power group and the incident surface of the second prism has a concaved surface shape facing the object side. The image pickup optical system is characterized by satisfying the conditional expressions (1) and (2).

$$-4.2 < fp2/f < -0.2 \qquad (1)$$

$$0.2 < |f\_1p/fp2| < 1.5 \qquad (2)$$

In these expressions, fp2 is a focal length of the second prism, f is a focal length of an entire of the image pickup optical system, and f_1p is a focal length of the power group closest to the incident surface of the second prism.

An image pickup optical system of the second aspect is characterized by, in the first aspect, further comprising, on the optical path between reflection surfaces of the two reflection prisms, a stop and at least one negative power group located closer to the image side than the stop.

An image pickup optical system of the third aspect is characterized by, in the second aspect, satisfying the following conditional expression (3).

$$0.5 < |f\_1n/f\_1p| < 1.5 \quad (3)$$

In the expression, f_1n is a focal length of the negative power group located closer to the image side than the stop.

An image pickup optical system of the fourth aspect is characterized in that, in any one of the first to third aspects, the positive power group comprises at least one positive lens satisfying the following conditional expression (4).

$$0.56 < nd\_1p/nd\_p2 < 0.97 \quad (4)$$

In the expression, nd_1p is a refractive index of the positive lens and nd_p2 is a refractive index of a prism material forming a reflection surface of the second prism.

An image pickup optical system of the fifth aspect is characterized in that, in any one of the first to fourth aspects, the positive power group comprises at least one positive lens satisfying the following conditional expression (5).

$$1.1 < vd\_1p/vd\_p2 < 4 \quad (5)$$

In the expression, vd_1p is an Abbe number of the positive lens and vd_p2 is an Abbe number of a prism material forming a reflection surface of the second prism.

An image pickup optical system of the sixth aspect is characterized by, in any one of the first to fifth aspects, comprising at least one optical member on the optical path between the two reflection prisms, for being driven in a focusing process.

An image pickup optical system of the seventh aspect is characterized by, in any one of the first to sixth aspects, comprising a plurality of optical members on the optical path between the two reflection prisms, for being moved in a focusing process.

An image pickup optical system of the eighth aspect is characterized in that, in any one of the first to seventh aspects, at least one of the two reflection prisms comprises a glass material.

An image pickup optical system of the ninth aspect is characterized in that, in any one of the first to eighth aspects, at least one of the two reflection prisms comprises a resin material.

An image pickup optical system of the tenth aspect is characterized in that, in any one of the first to ninth aspects, at least one of the two reflection prisms comprises a composite material.

An image pickup optical system of the eleventh aspect is characterized in that, in any one of the first to tenth aspects, at least one of the two reflection prisms comprises a prism section comprising a glass material and a lens section forming a power surface with a resin material on an optical surface of the prism section.

An image pickup optical system of the twelfth aspect is characterized by, in any one of the first to eleventh aspects, further comprising an infrared-cut filter on the optical path between the two reflection prisms.

An image pickup optical system of the thirteenth aspect is characterized in that, in any one of the first to eleventh aspects, at least one of the two reflection prisms comprises an infrared-cut function for reducing a component of an infrared ray included in an incident light.

An image pickup optical device of the fourteenth aspect is characterized by comprising: the image pickup optical system of any one of the first to thirteenth aspects; and an image pickup element for converting an optical image formed on the light-receiving surface into electric signal.

A digital equipment of the fifteenth aspect is characterized by comprising the image pickup optical device of the fourteenth aspect by which at least one of functions of shooting a still image of a subject and of shooting a movie of the subject.

Advantageous Effects of Invention

According to the present invention, a decrease of the thickness of the second prism and an aberration-correction function provide high optical performance which can handle an image pickup element with the increased number of pixels, and enable to achieve a decreased thickness of the entire optical structure. Further, employing an image pickup optical system relating to the present invention, realizes an image pickup optical device and a digital equipment each of which achieves both of the reduced thickness and the increased number of pixels.

DESCRIPTION OF EMBODIMENTS

Figure 1:
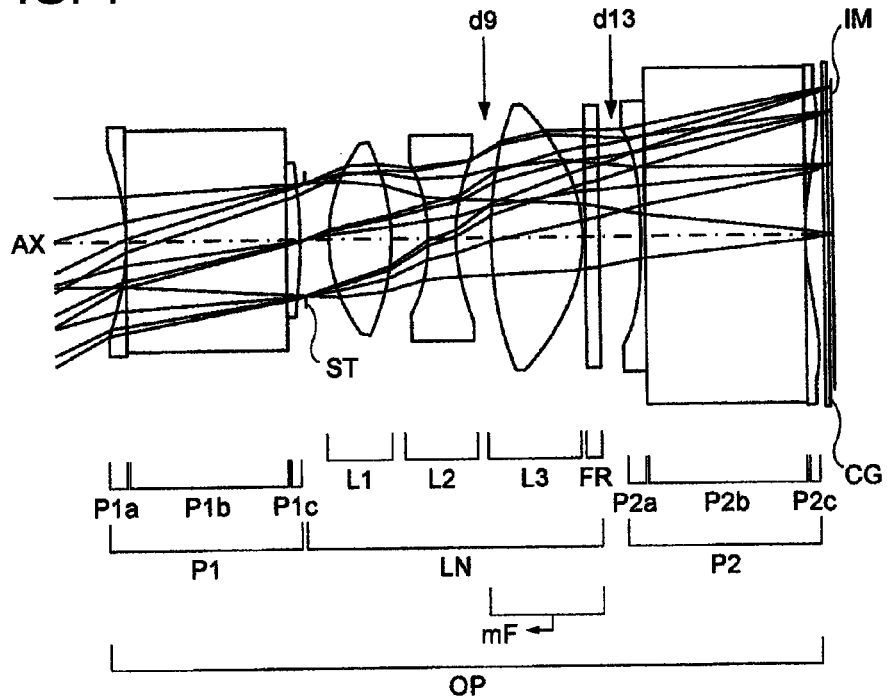
FIG. 1 is an optical construction diagram showing the first embodiment (Example 1) with an optical sectional view under the condition that the optical path is unbent.
Figure 2:
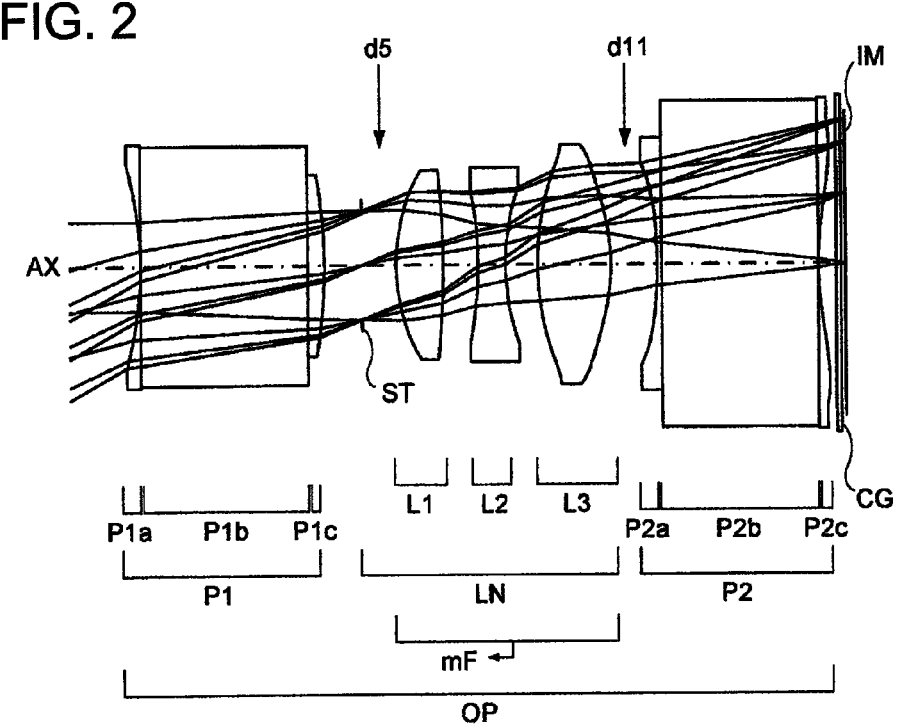
FIG. 2 is an optical construction diagram showing the second embodiment (Example 2) with an optical sectional view under the condition that the optical path is unbent.
Figure 3:
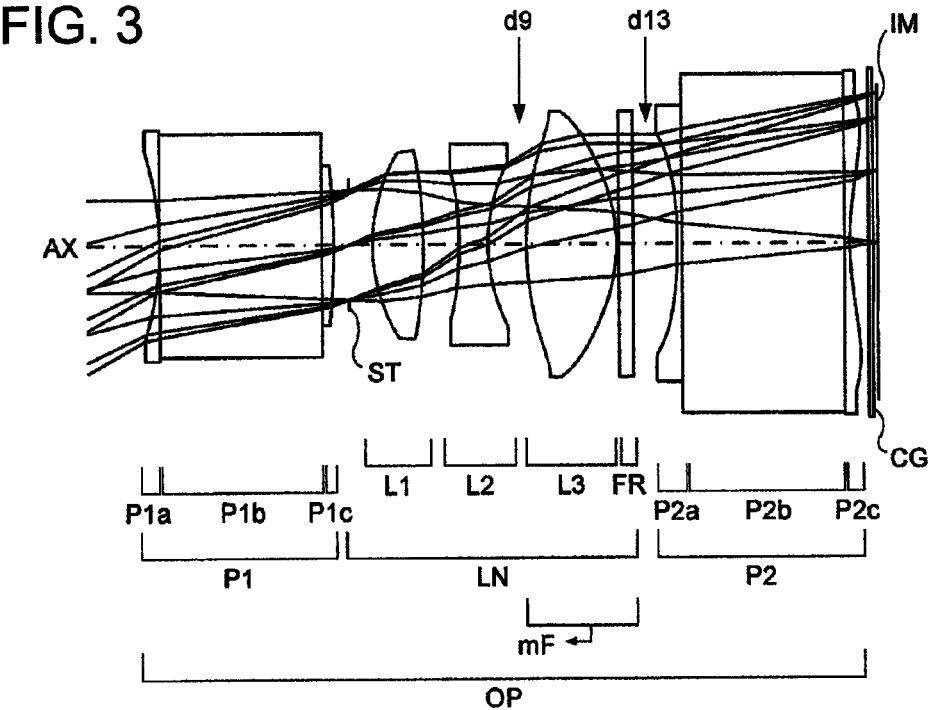
FIG. 3 is an optical construction diagram showing the third embodiment (Example 3) with an optical sectional view under the condition that the optical path is unbent.
Figure 4:
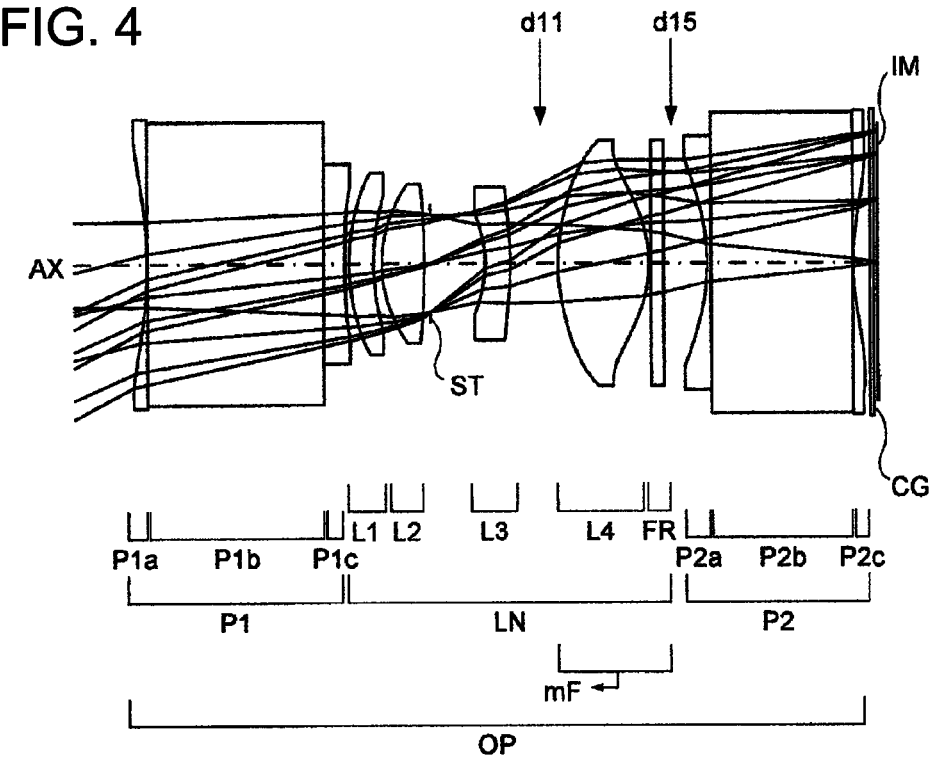
FIG. 4 is an optical construction diagram showing the fourth embodiment (Example 4) with an optical sectional view under the condition that the optical path is unbent.
Figure 5:
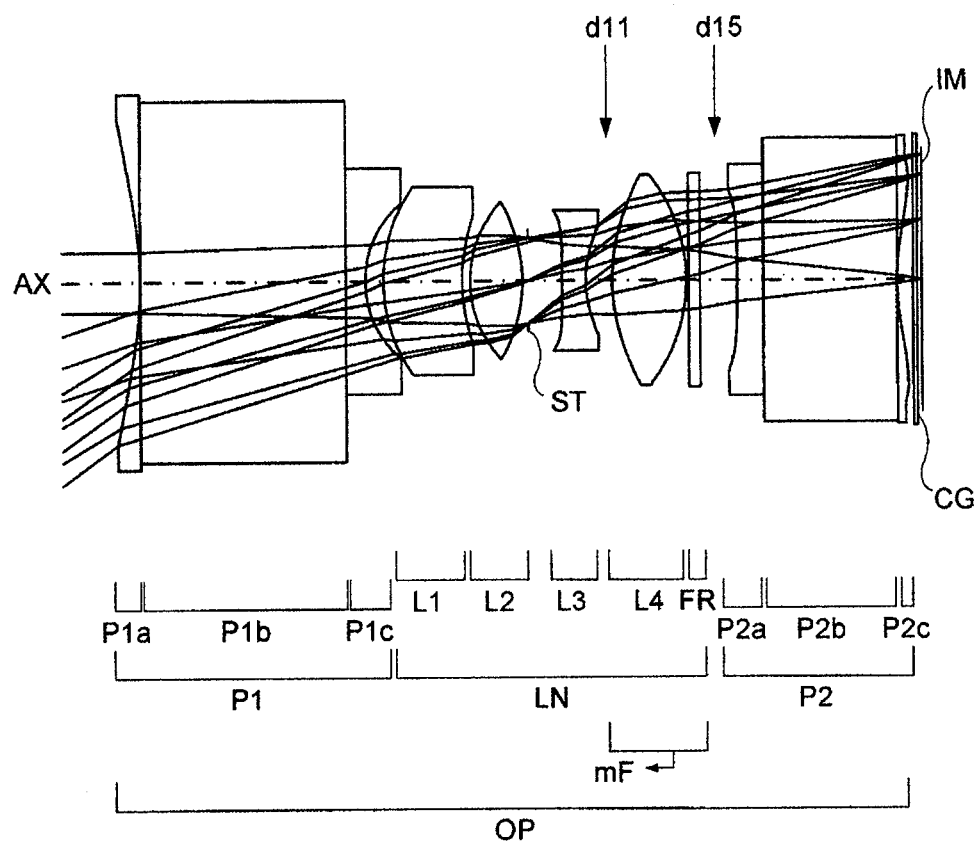
FIG. 5 is an optical construction diagram showing the fifth embodiment (Example 5) with an optical sectional view under the condition that the optical path is unbent.
Figure 6:
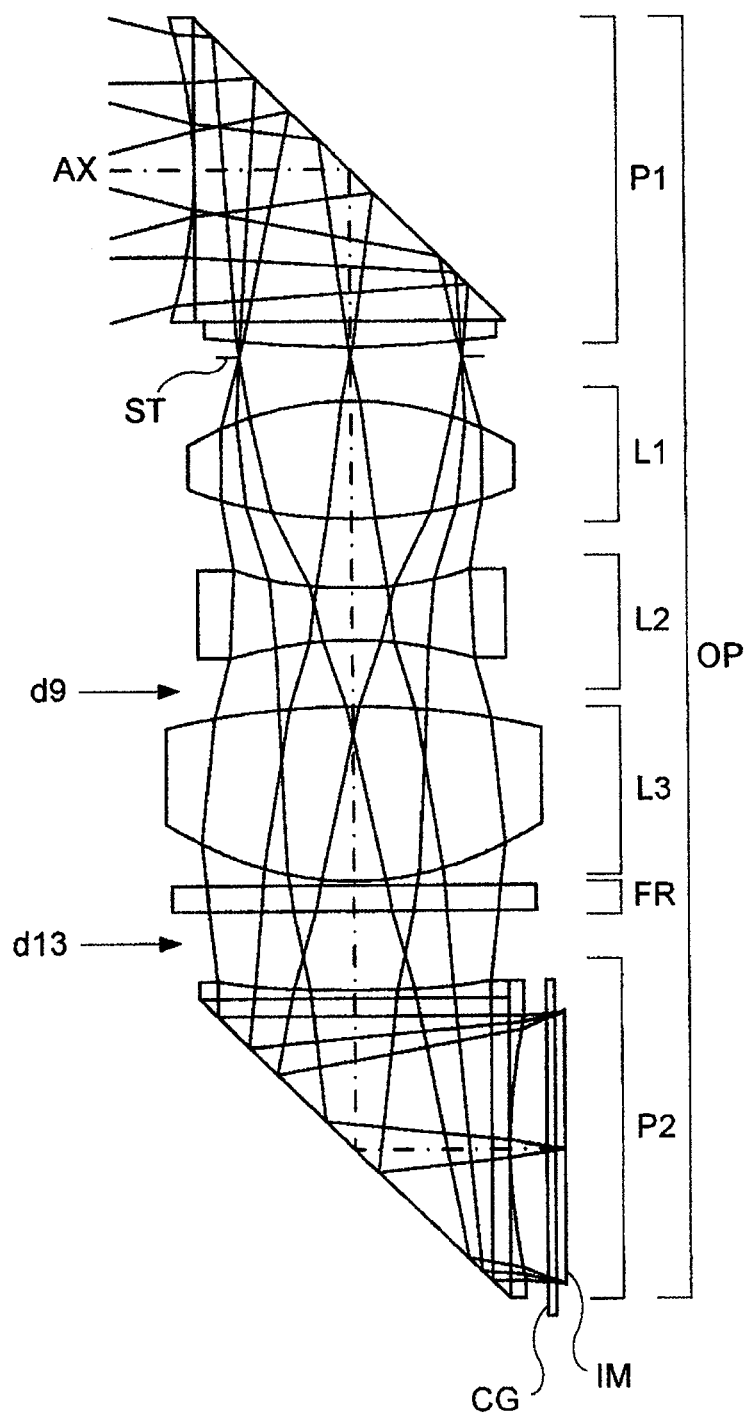
FIG. 6 is an optical construction diagram showing the first embodiment (Example 1) with an optical sectional view under the condition that the optical path is bent.
Figure 7:
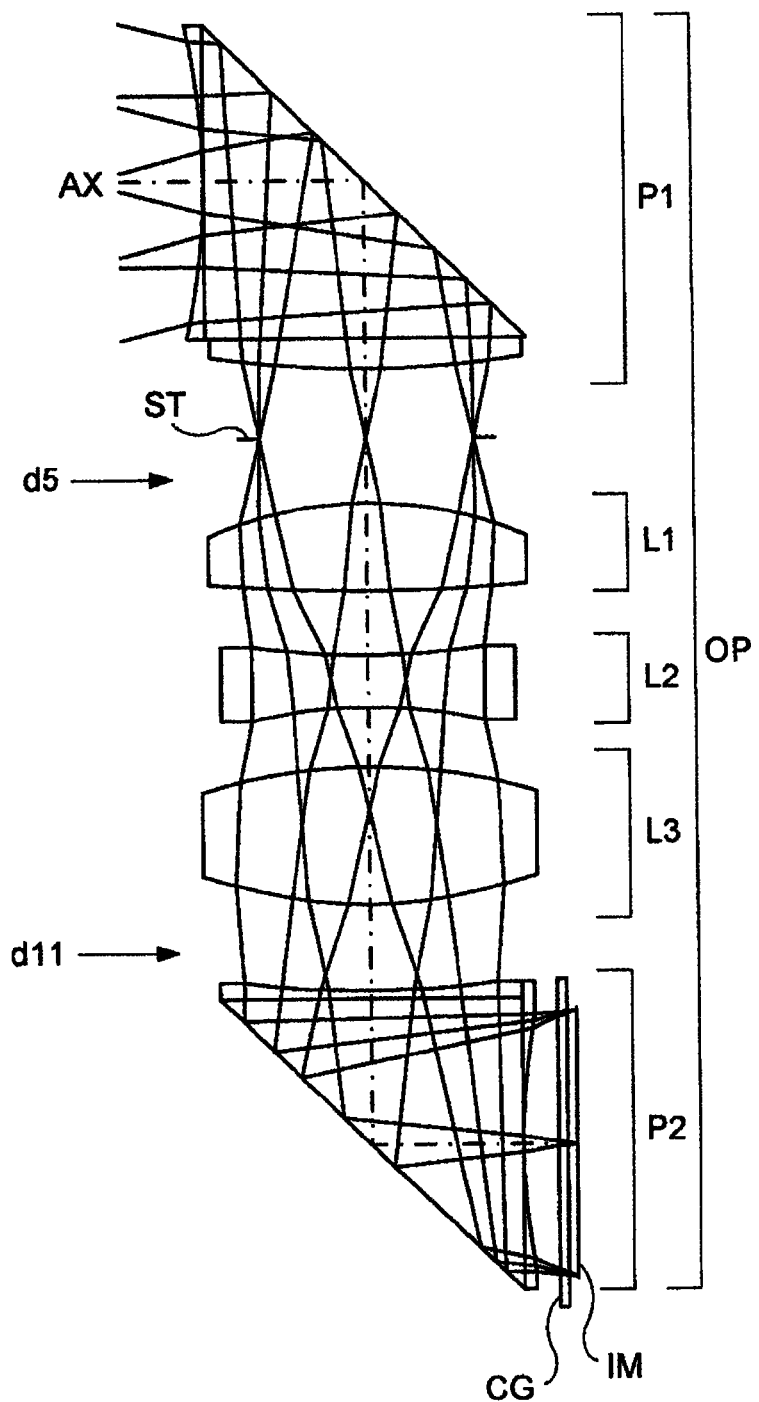
FIG. 7 is an optical construction diagram showing the second embodiment (Example 2) with an optical sectional view under the condition that the optical path is bent.
Figure 8:
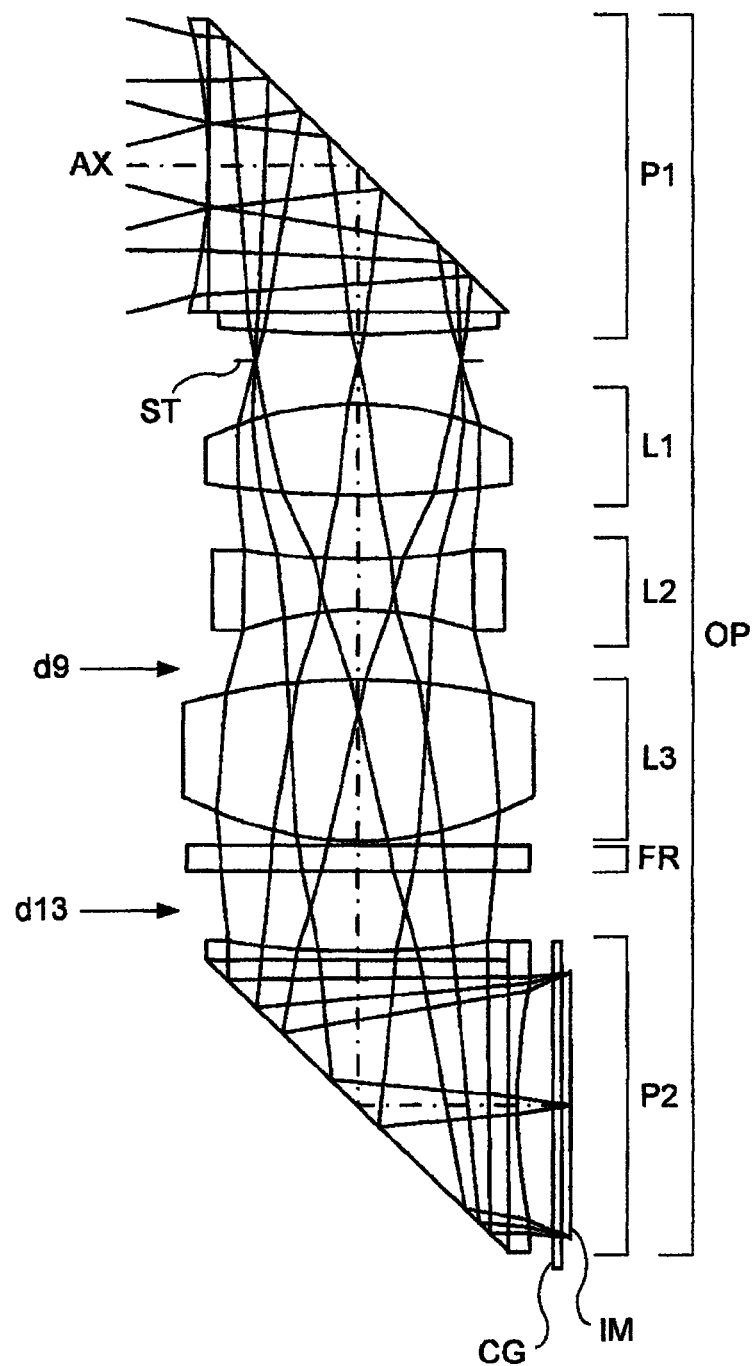
FIG. 8 is an optical construction diagram showing the third embodiment (Example 3) with an optical sectional view under the condition that the optical path is bent.
Figure 9:
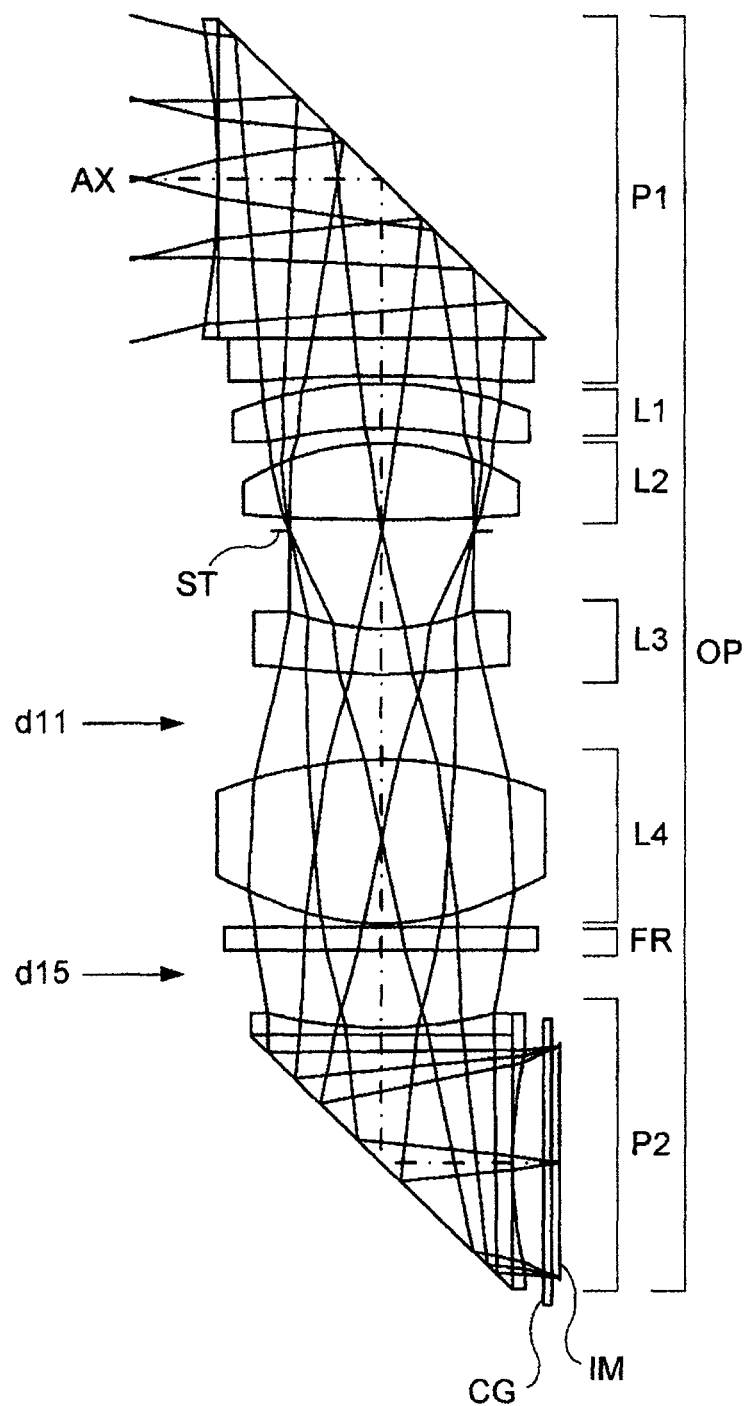
FIG. 9 is an optical construction diagram showing the fourth embodiment (Example 4) with an optical sectional view under the condition that the optical path is bent.
Figure 10:
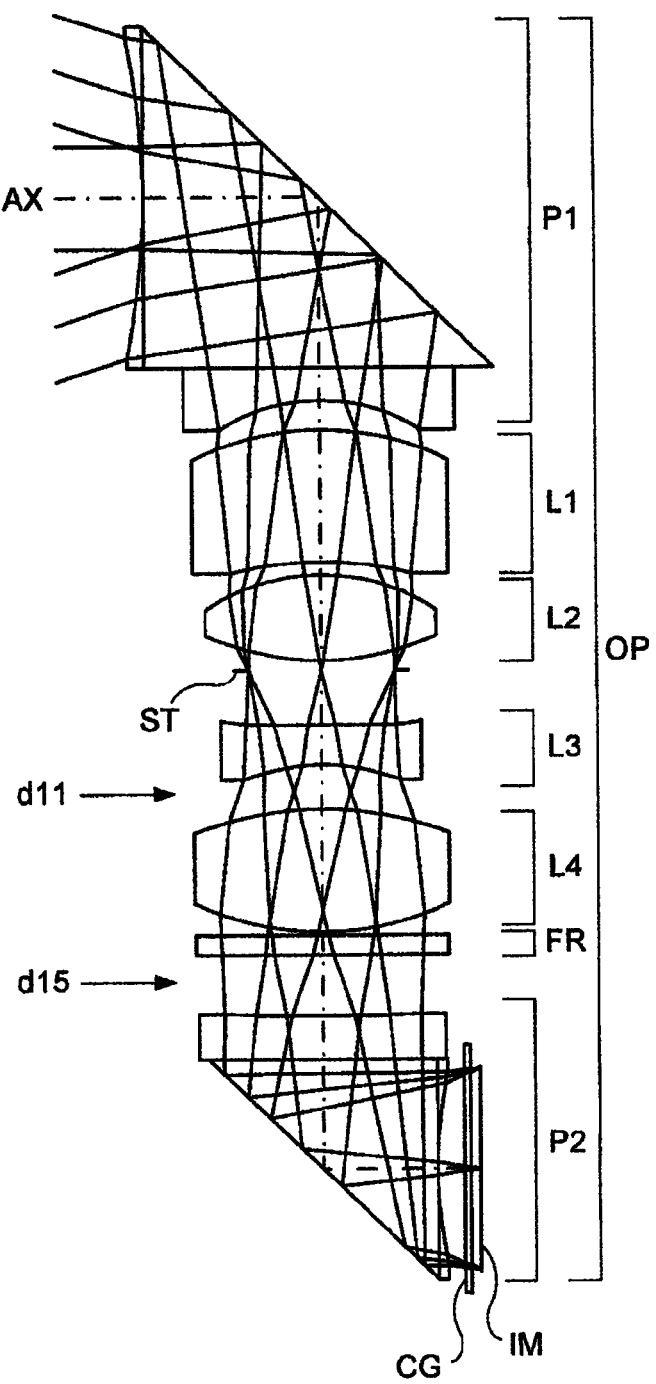
FIG. 10 is an optical construction diagram showing the fifth embodiment (Example 5) with an optical sectional view under the condition that the optical path is bent.
Figure 11:
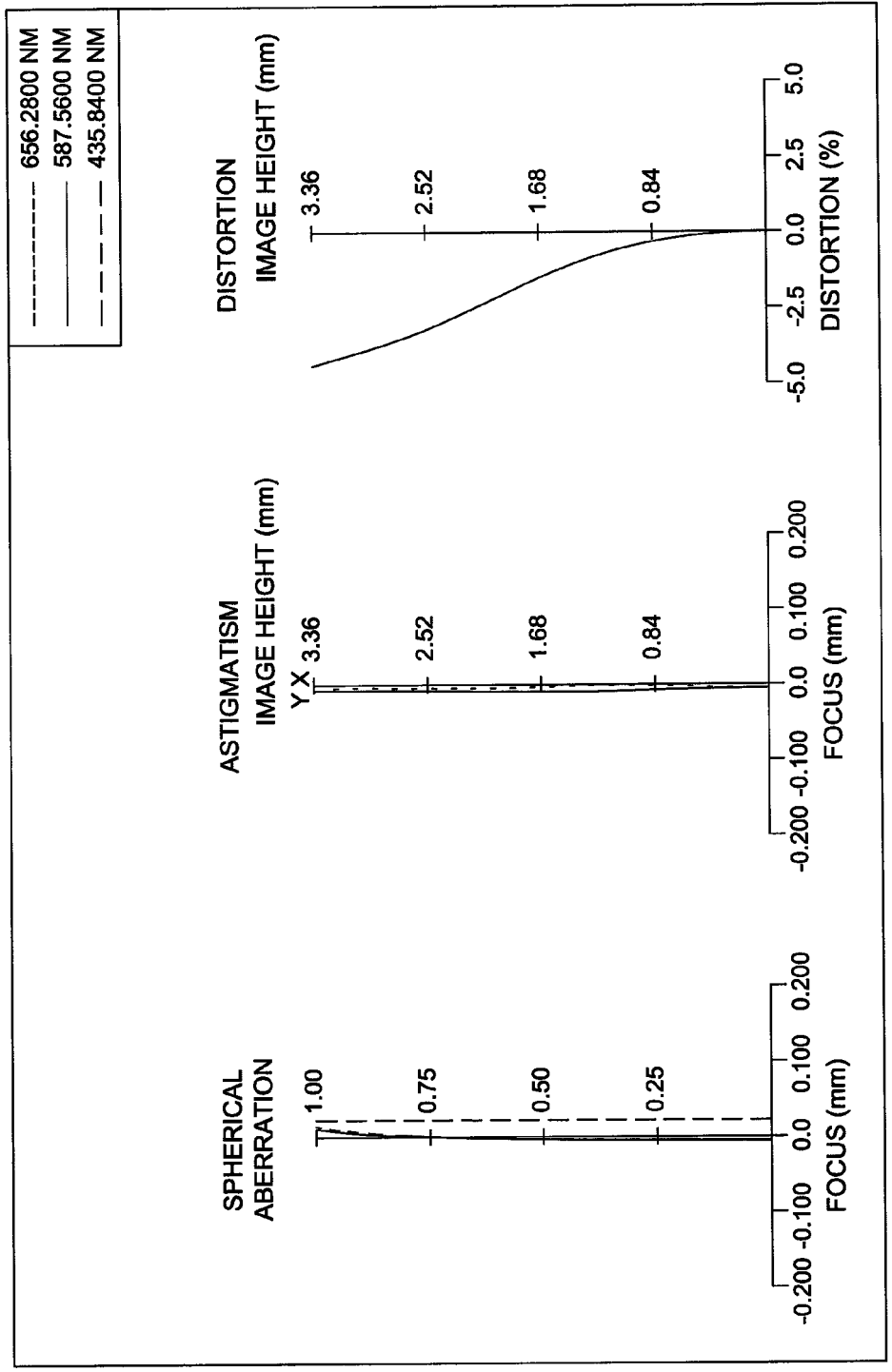
FIG. 11 is an aberration diagram of Example 1 under the condition that the focus is adjusted to infinity.
Figure 12:
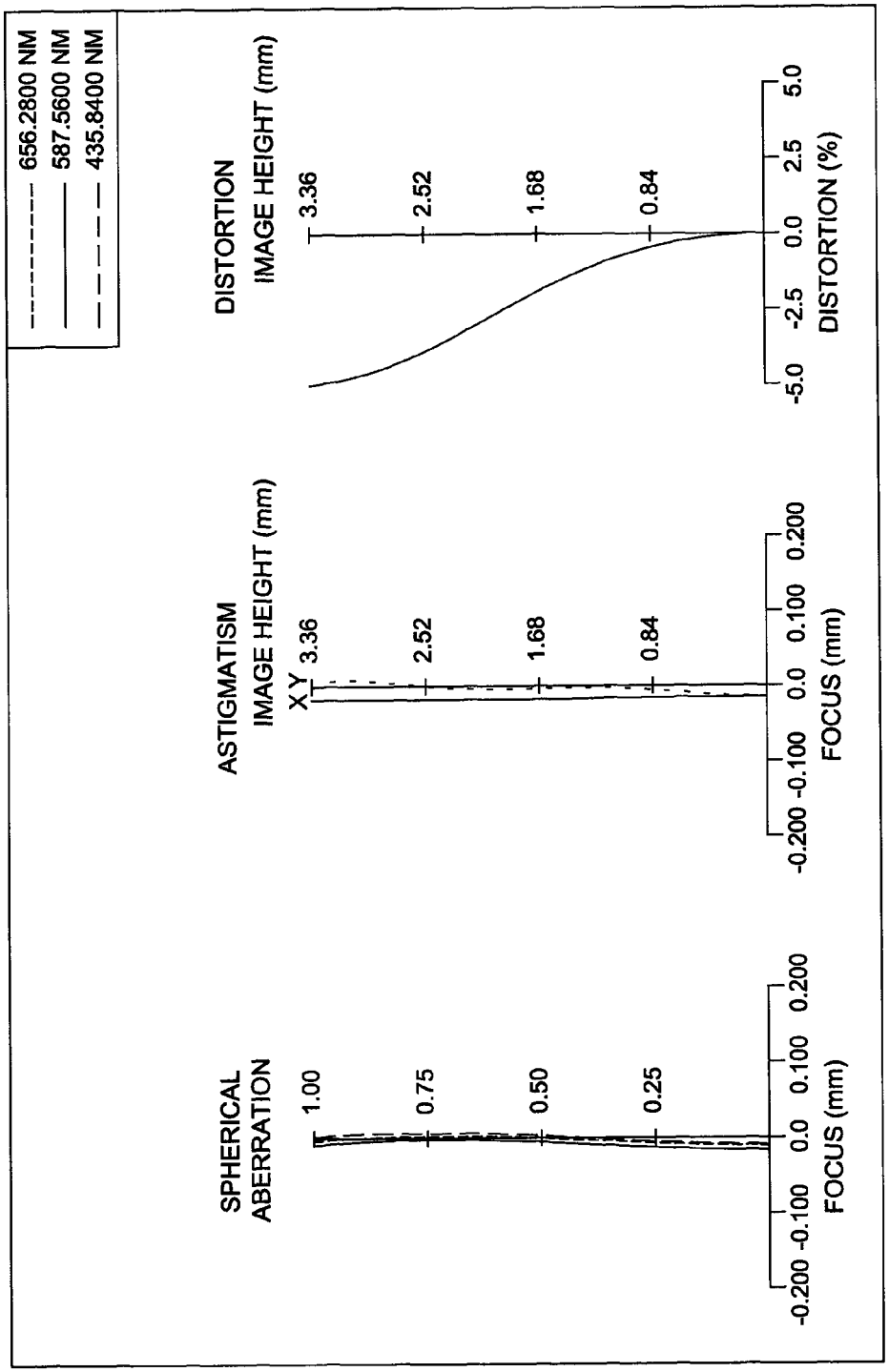
FIG. 12 is an aberration diagram of Example 2 under the condition that the focus is adjusted to infinity
Figure 13:
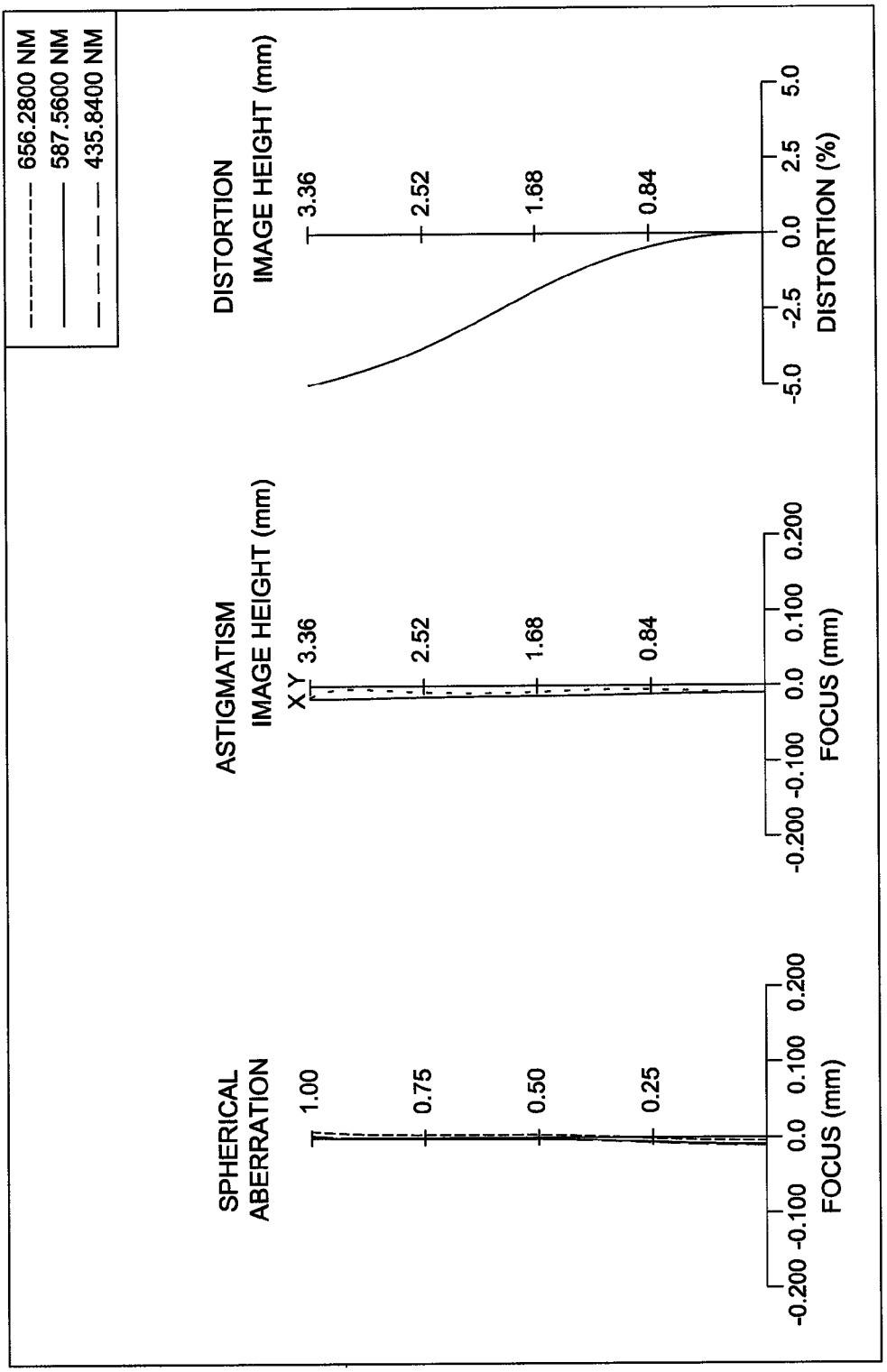
FIG. 13 is an aberration diagram of Example 3 under the condition that the focus is adjusted to infinity
Figure 14:
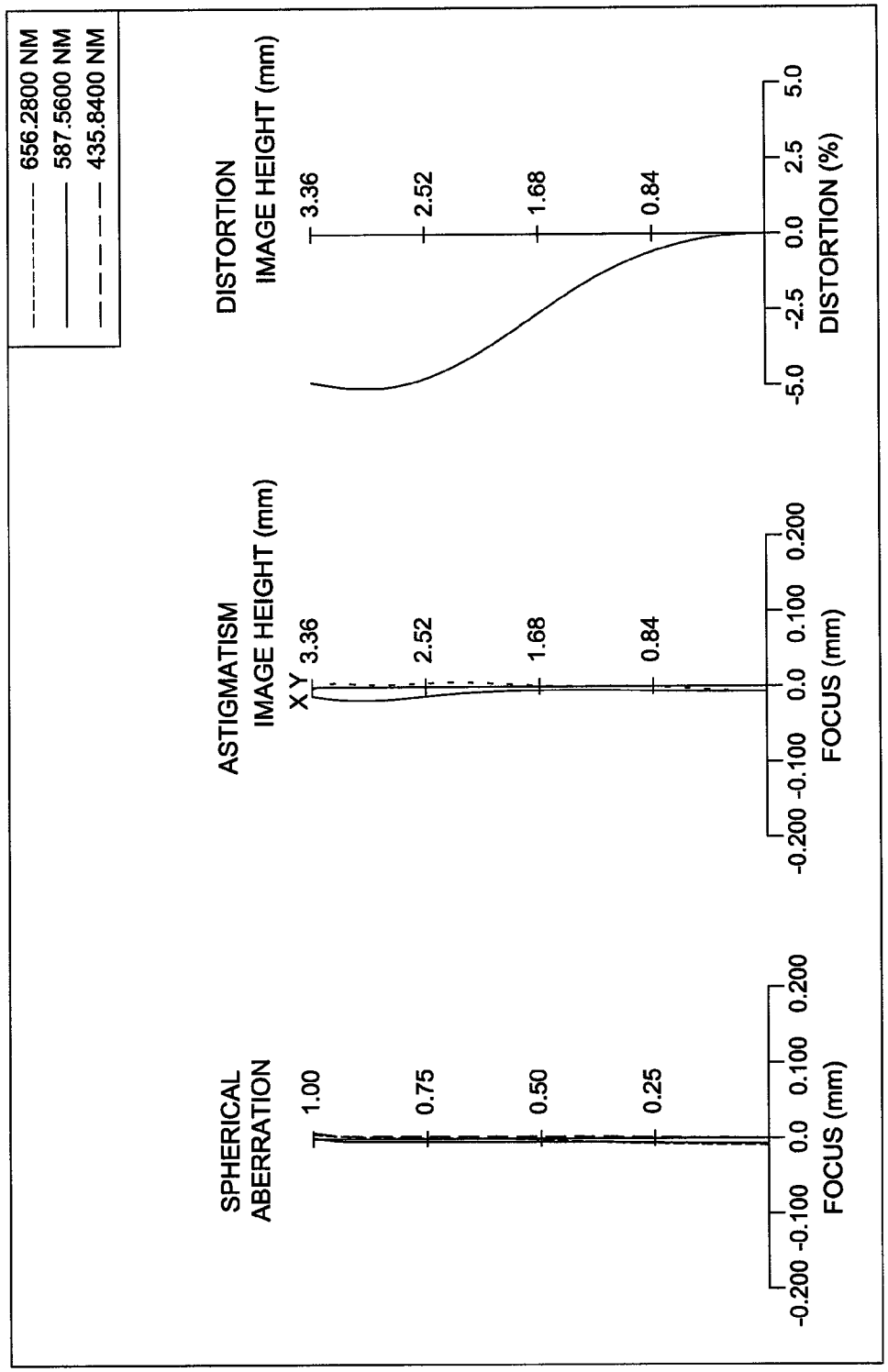
FIG. 14 is an aberration diagram of Example 4 under the condition that the focus is adjusted to infinity
Figure 15:
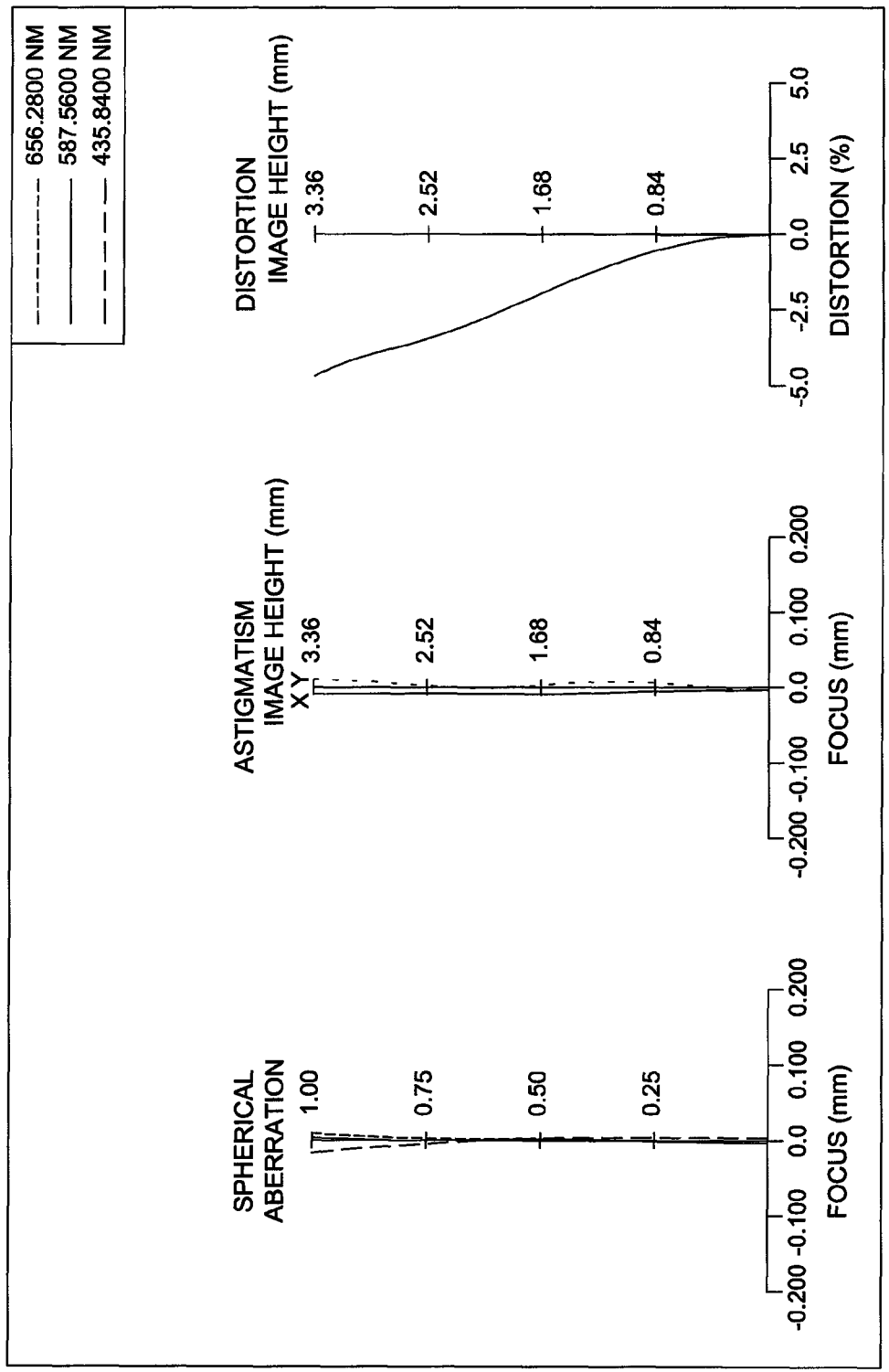
FIG. 15 is an aberration diagram of Example 5 under the condition that the focus is adjusted to infinity.
Figure 16:
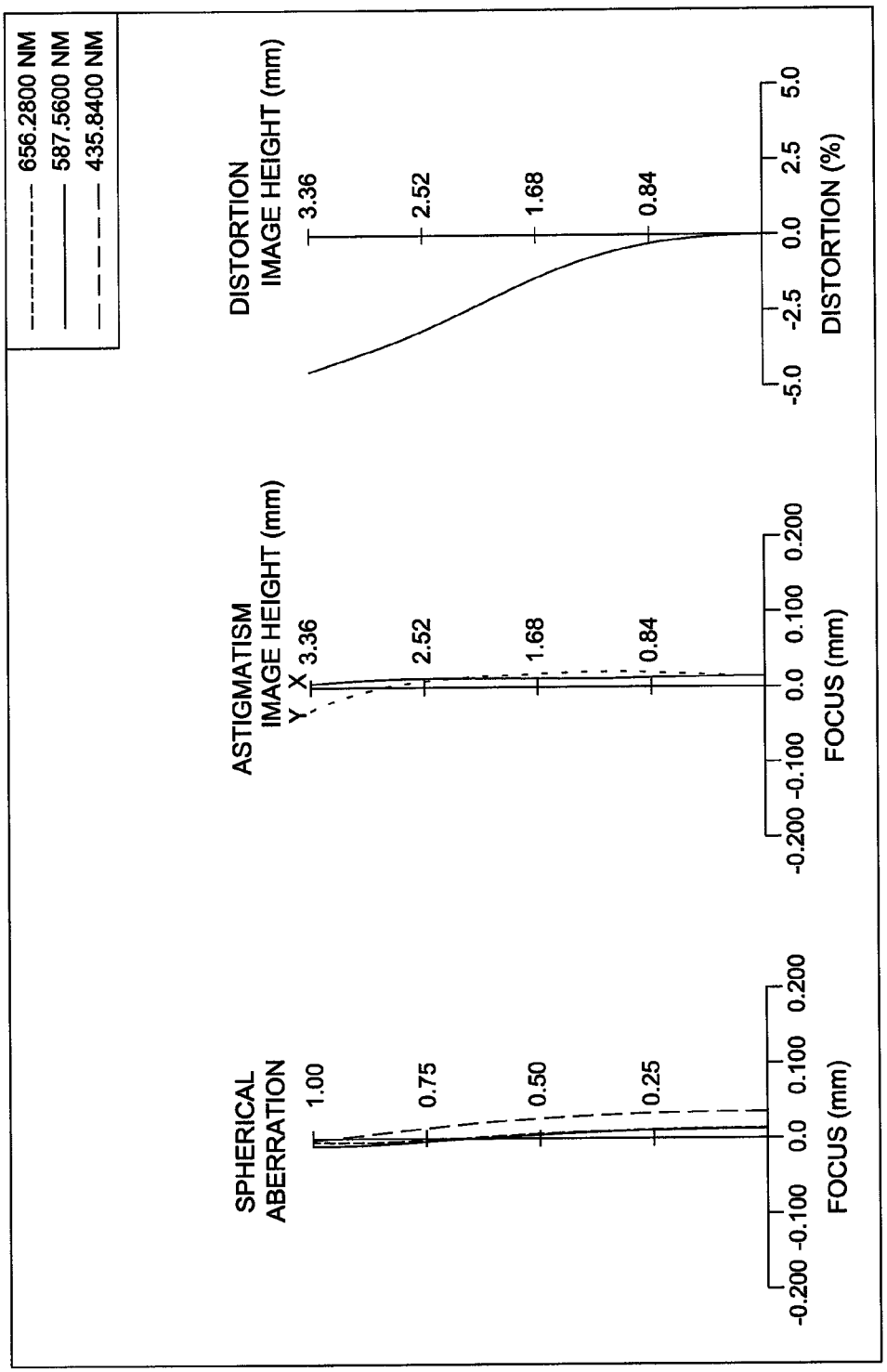
FIG. 16 is an aberration diagram of Example 1 under the condition that the focus is adjusted to a close distance.
Figure 17:
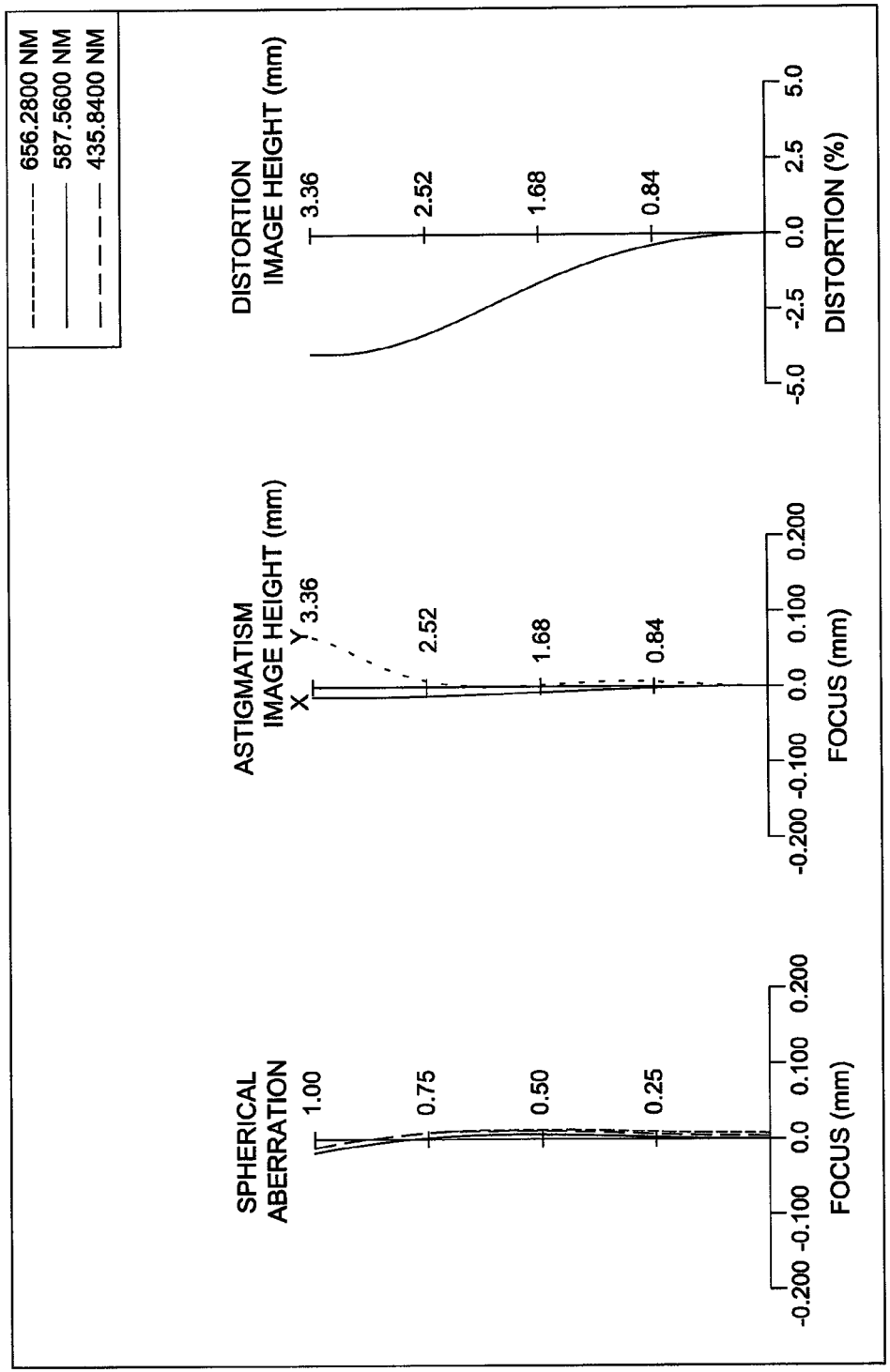
FIG. 17 is an aberration diagram of Example 2 under the condition that the focus is adjusted to a close distance.
Figure 18:
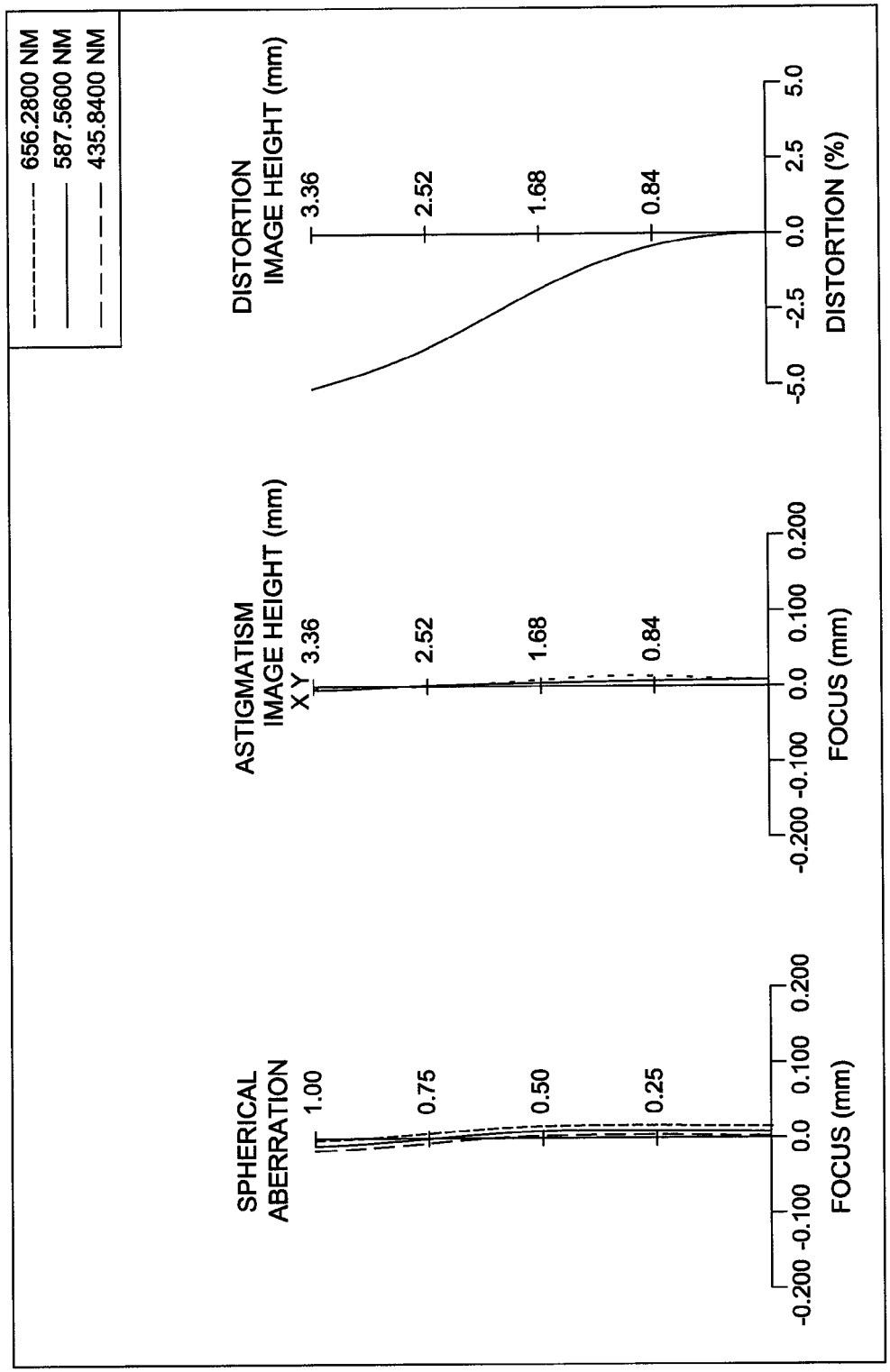
FIG. 18 is an aberration diagram of Example 3 under the condition that the focus is adjusted to a close distance.
Figure 19:
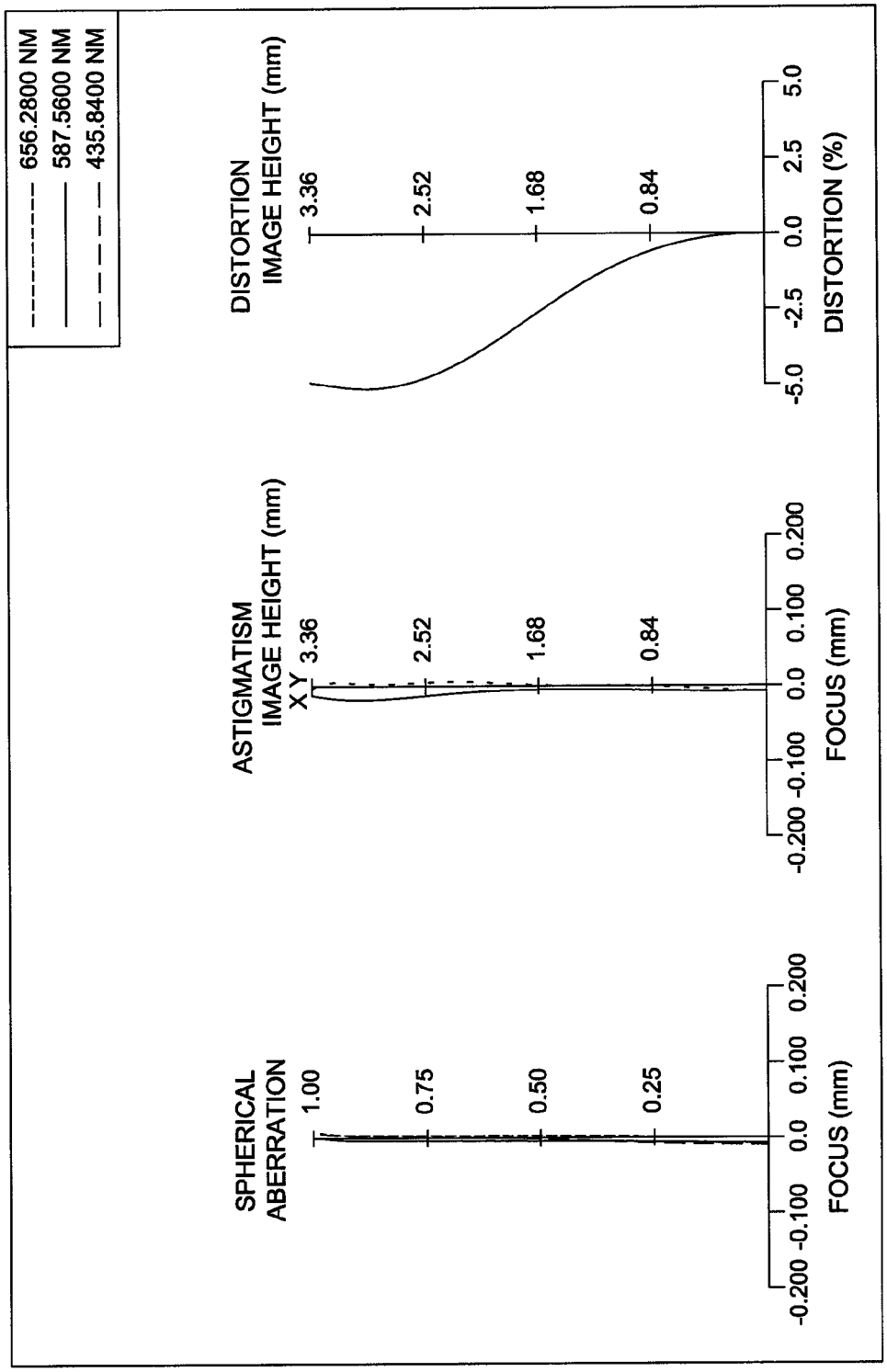
FIG. 19 is an aberration diagram of Example 4 under the condition that the focus is adjusted to a close distance.
Figure 20:
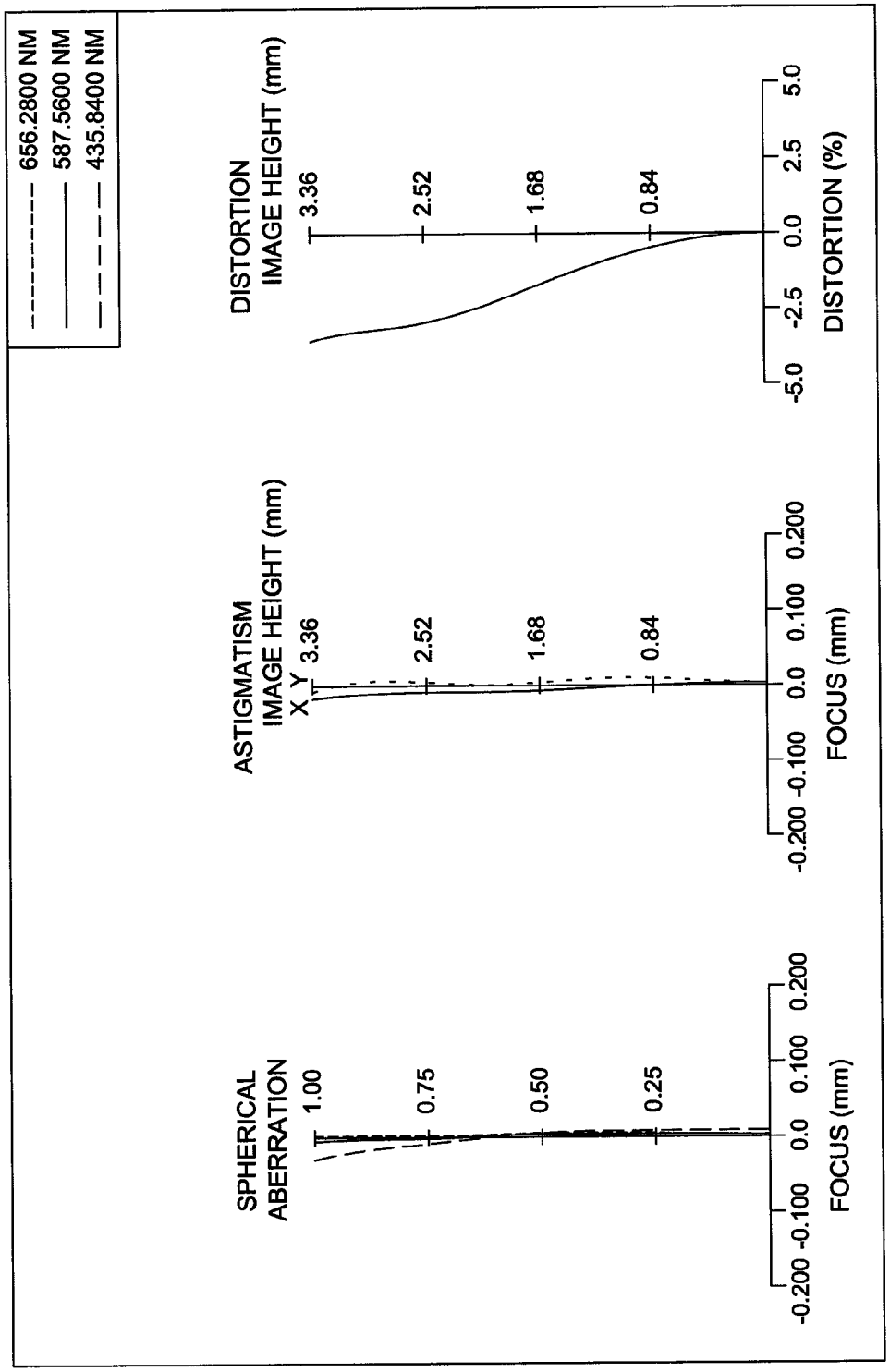
FIG. 20 is an aberration diagram of Example 5 under the condition that the focus is adjusted to a close distance.

Hereinafter, an image pickup optical system relating to the present invention will be described with referring to the drawings. An image pickup optical system relating to the present invention is suitable to be used for a digital equipment with an image input function. When the image pickup optical system is combined with a device such as an image pickup element, it can construct an image pickup optical device which takes an image of a subject therein in an optical manner and outputs it as electric signal. The image pickup optical device is an optical device forming an essential construction part of a camera used for shooting a still image or movie of a subject. For example, the image pickup optical device is composed of, in order from an object (namely, a subject), an image pickup optical system for forming an optical image of the object, and an image pickup element for converting the optical image formed by the image pickup optical system into electric signal.

As an example of a camera, a digital camera, a video camera, a security camera and a videophone camera are cited. Further, the camera may also be built in or be attached on a personal computer, a mobile terminal (for example, a compact and portable information equipment terminal such as a mobile computer, a cell-phone and a mobile information terminal), a peripheral of the aforesaid equipment (a scanner and a printer or the like) and other digital equipment; and may also be built in or be attached on home electric appliances. As is understood from these examples, loading of an image pickup optical device constructs not only a camera but also various types of equipment having functions of a camera. For example, a digital equipment with an image input function such as a cell-phone equipped with a camera can be constructed.

Figure 21:
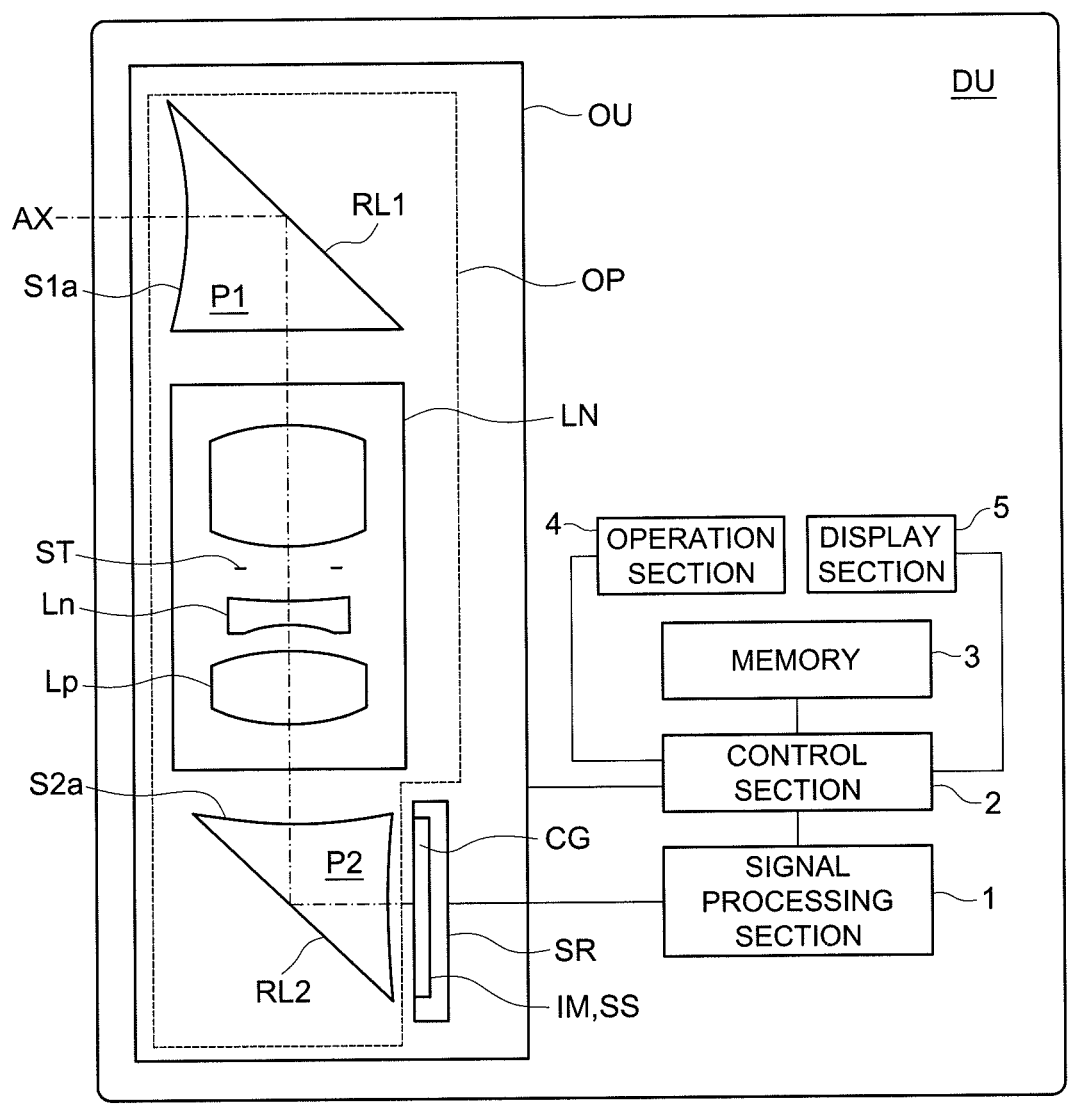
FIG. 21 is a schematic view showing an example of an outline structure of a digital equipment with an image input function relating to the present invention.

FIG. 21 shows a diagram of an example of a schematic construction of digital equipment DU with an image input function, by using a schematic sectional view. Image pickup optical device OU mounted in the digital equipment DU shown in FIG. 21 includes, in order from the object side, image pickup optical system OP for forming optical image (image plane) IM of the object, and image sensor SR (where CG is a cover glass) for converting optical image IM formed on light-receiving surface SS formed by image pickup optical system OP into electric signal (Herein, shapes of optical surfaces, power arrangement, and arrangement of the stop in FIG. 21 are just provided as an example, and an actual structure is not limited to them). When digital equipment DU with an image input function is formed with the image pickup optical device OU, image pickup optical device OU is generally arranged inside a body of the digital equipment. At that time, any embodiment which suits the situation can be taken for realizing camera functions. For example, unitized image pickup optical device OU can be structured so as to be mounted on or dismounted from a main body of digital equipment DU freely, or it can be structured so as to be freely rotatable on a main body of digital equipment DU.

As image pickup element SR, for example, a solid-state image pickup element having plural pixels such as a CCD (Charge Coupled Device) sensor and a CMOS (Complementary Metal-Oxide Semiconductor) sensor is employed. The image pickup optical system OP is arranged so that optical image IM of a subject may be formed on light-receiving surface SS of image pickup element SR. Therefore, optical image IM formed by the image pickup optical system OP is converted into electric signal by image pickup element SR.

Digital equipment DU includes signal processing section 1, control section 2, memory 3, operation section 4 and display section 5, in addition to the image pickup optical device OU. The signal processing section 1 conducts prescribed digital image processing and image compression processing, for signal generated by image pickup element SR, as occasion demands. Then, the processed signal is recorded in memory 3 (such as semiconductor memory and optical disc) as digital image signal, or is transmitted to the other equipment by passing through cables or being converted into infrared signal. The control section 2 is composed of a microcomputer and intensively carries out a control for image pickup function (function of shooting still images and function of shooting movies) and image reproducing function, and a control of a lens drive mechanism for a focusing operation. For example, the control section 2 controls image pickup optical device OU so that at least one of shooting still images of a subject and shooting movie of a subject may be carried out. The display section 5 is a portion including a display such as a liquid crystal monitor, and it displays images by using image signal converted by image pickup element SR or by using image information recorded in memory 3. The operation section 4 is a portion including operating members such as an operation button (for example, a release button) and an operation dial (for example, a shooting mode dial), and it transmits information operated and inputted by an operator to control section 2.

Image pickup optical system OP includes two reflection prisms each of which bends the incident light at an almost right angle (in other words, bends optical axis AX at 90 degrees), and image pickup optical system OP forms a light-bending optical system in which the two prisms are arranged so as to bend optical axis AX twice along a virtual plane (for example, a sheet surface of FIG. 21). Out of the two reflection prisms, the reflection prism located at the object side (at the side of the subject) along the optical path is first prism P1, the reflection prism located at the image side (at the side of image pickup element SR) along the optical path is second prism P2. Herein, the center principal ray of a light flux entering the center of the image area corresponds to optical axis AX.

In image pickup optical system OP, by using reflection on reflection surfaces RL1 and RL2 of first and second prisms P1 and P2, an optical path of light entering each of them is bent at an almost right angle (almost 90 degrees), and optical axis AX on the incident surface of prism P1 (the surface where light enters the prism) and optical axis AX on the outgoing surface of prism P2 (the surface where light outgoes from the prism) are parallel with each other. Since optical axis AX at a position closest to the object and optical axis AX at a position closest to the image in image pickup optical system. OP are almost parallel with each other, the direction of those optical axes AX corresponds to the thickness direction of the optical structure. Since light-receiving surface SS of image pickup element SR is almost perpendicular to optical axis AX on the outgoing surface of prism P2, even if the size of light-receiving surface SS is large, such the situation does not bring an increase of the thickness of the entire of image pickup optical device OU. In other words, the thickness of image pickup optical device OU can be reduced regardless the size of image surface IM. Therefore, when two reflection prisms are arranged as described above, both of reducing the thickness of the entire optical structure and increasing the number of pixels can be achieved.

By bending the optical path at an almost right angle as described above, the optical path of object light can be bent and superimposed around each of reflection surfaces RL1 and RL2. Since it allows an effective use of the space, reducing the thickness of image pickup optical system OP is effectively achieved. Further, by using the reflection prisms for bending the optical path, the equivalent surface-distance between the incident surface of the prism and the outgoing surface of the prism can be reduced. Therefore, it achieves to make image pickup optical system OP compact effectively.

In image pickup optical system OP, at least one of first and second prisms P1 and P2 has optical power. In each of first and second prisms P1 and P2, at least one of the incident surface and outgoing surface preferably has optical power. Thereby, aberration generated in image pickup optical system OP can be corrected.

Incident surface S2a of second prism P2 preferably has a concaved surface shape toward the object side. A prism without power is equivalent to a thick parallel flat plate with opposing surfaces being flat surfaces. When converged light enters the prism at an angle, great astigmatism is generated in proportion to the thickness of the prism. By forming incident angle S2a of second prism P2 into a concave shape, astigmatism generated in second prism P2 can be corrected.

When the outgoing surface of second prism P2 has great power, the size of the prism becomes great. Therefore, the thickness of image pickup optical system OP is hardly reduced. In order to reduce the size of the prism, power of the outgoing surface of second prism P2 needs to be weakened. Accordingly, in order to correct the astigmatism without affecting the thickness of second prism P2, it is preferable that power is given to the incident surface rather than the outgoing surface. In other words, it is preferable to form incident surface S2a of second prism P2 into concaved surface shape, in view of achieving both of proper aberration correction and proper prism size. As the result, second prism P2 has negative power.

There is arranged lens system LN having positive power as the total system, between first prism P1 and second prism P2. Lens system LN includes a plurality of lens components (lens elements) and stop ST (aperture stop). The lens system may include an optical component such as a filter (for example, optical falters including an infrared-cut filter and optical low-pass filter). When a lens component is arranged at the object side of first prism P1 or at the image side of second prism P2, it enlarges the thickness of image pickup optical system OP. However, when a lens component is arranged between first prism P1 and second prism P2, it enables to avoid increase of the thickness of image pickup optical system OP caused by the arrangement of the lens component. Therefore, it is preferable that a lens component is arranged between prism P1 and prism P2 in image pickup optical system OP. As an optical component other than a lens component, there may be arranged a cover glass for protection at the object side of first prism P1, or a parallel flat plate such as an infrared-cut filter at the image side of second prism P2.

Lens system LN located at the position between first and second prisms P1 and P2 is preferably includes at least one power group. In other words, it is preferable that there is provided a lens element or lens elements forming at least one power group on the optical path between the two reflection prisms P1 and P2. The power group corresponds to an element group forming a power arrangement of a lens type. Accordingly, the power group may be a structure having just a single lens as an optical component with power, a structure having just a single cemented lens as an optical component with power, or a structure having plural individual lenses as optical components with power, and may include an optical component without power such as a parallel flat plate.

The power group closest to incident surface S2a of second prism P2 preferably has positive power. Namely, it is preferable to be positive power group Lp. The positive power group Lp is a structure having just a single lens as an optical component with power, or a structure having just a single cemented lens as an optical component with power. Positive power group Lp may include an optical component without power such as a parallel flat plate, but does not include a plurality of individual lenses as optical components with power, in view of the relationship with its arrangement. The thickness of the second prism is determined by the size of an effective area of each of the incident surface and outgoing surface in the sectional surface along the direction of the shorter side of the image area (see FIGS. 6 to 10 which will be descried later). In order to reduce the maximum value of the sizes of the effective areas of the incident surface and the outgoing surface, it is preferable that the sizes of the effective areas of both surfaces are made coincide with each other as much as possible. It means that the principal ray at each angle of view becomes substantially parallel with the optical axis. Since the incident surface of the second prism has negative power, the angle formed between the principal ray at each angle of view and the optical axis in the prism is reduced by arranging a positive power group in front of and next to the second prism. Thereby, the thickness of second prism P2 can be reduced.

Second prism P2 preferably satisfies the following conditional expression (1), in view of reducing its thickness and correcting aberrations.

$$-4.2 < fp2/f < -0.2 \tag{1}$$

In the expression, fp2 is a focal length of the second prism, and f is a focal length of an entire of the image pickup optical system.

The conditional expression (1) provides a conditional range which is preferable for achieving excellent imaging properties on the image plane and reducing the thickness of the whole optical structure. When the value becomes below the lower limit of the conditional expression (1), power of second prism P2 becomes weak and astigmatism (namely, astigmatism generated by light entering second prism P2 at an angle) is insufficiently corrected. Inversely, when the value exceeds the upper limit of the conditional expression (1), the power of second prism P2 becomes strong, which hardly makes a light flux along the direction of the shorter side of the image area telecentric. Therefore, an increase of the effective diameter of the prism, increases the thickness of the prism and the thickness of image pickup optical system OP. Further, in view of optical performance, it increases coma.

The following conditional expression (1a) is preferably satisfied and the following conditional expression (1b) is more preferably satisfied.

$$-3.6 < fp2/f < -0.2 \tag{1a}$$

$$-3.0 < fp2/f < -0.2 \tag{1b}$$

These conditional expressions (1a) and (1b) provide further more preferable conditional ranges out of the conditional range provided by the above conditional expression (1). The above-described effect can be much greater when the conditional expression (1a) is preferably satisfied or the conditional expression (1b) is more preferably satisfied.

Second prism P2 and positive power group Lp2 preferably satisfy the following conditional expression (2), in view of reducing thickness of the optical structure and correcting aberrations. The conditional expressions (1) and (2) are more preferably satisfied.

$$0.2 < |f\_1p/fp2| < 1.5 \tag{2}$$

In the expression, f_1p is a focal length of the power group closest to the incident surface of the second prism, and fp2 is a focal length of the second prism.

The conditional expression (2) provides a conditional range which is preferable for making a light flux along the direction of the shorter side of the image area in second P2 telecentric. Satisfying the conditional expression (2) enables to reduce the thickness and size of second prism P2. When the value becomes below the lower limit of the conditional expression (2), positive power of power group (positive power group Lp) located closest to incident surface S2a of second prism P2 becomes strong and the effective diameter of positive power group Lp becomes great. Since the thickness of the entire optical structure is determined by the effective diameter of lens system LN, the thickness of the optical structure is hardly reduced. Further, in the view of optical performance, coma is hardly corrected. Inversely, when the value exceeds the upper limit of the conditional expression (2), the power of second prism P2 becomes stronger than power of the power group (positive power group Lp) located closest to incident surface S2a of second prism P2. It hardly makes a light flux along the direction of the shorter side of the image area telecentric, inside second prism P2, and increases the thickness of second prism P2.

The above-described conditional expressions (1) and (2) provide conditional ranges which are effective for achieving the reduced thickness and enhanced optical performance of second prism P2. The power of second prism P2 which is so strong to satisfy the conditional expression (1) is effective for astigmatism correction. Therefore, high optical performance can be secured also for image pickup element SR with the increased number of pixels. Further, when power group Lp located next to and in front of second prism P2 has positive power satisfying conditional expression (2), it is effective to make a light flux telecentric in second prism P2. Therefore, by making the effective diameters at the incident side and the outgoing side of second prism P2 almost coincide with each other, the thickness of second prism P2 can be reduced. As described above, by reducing the thickness of second prism P2 and ensuring an effect of the aberration correction, high optical performance which can cope with image pickup element SR with the increased number of pixels can be obtained and the reduced thickness of the entire optical structure can be achieved. By using such the image pickup optical system OP, image pickup optical device OU and digital equipment DU which achieve both of reducing the thickness of the entire optical structure and handling the increased number of pixels. Hereinafter, conditions for obtaining the above effects in a balanced manner and achieving higher optical performance and the more reduced thickness will be described.

There are preferably arranged stop ST and at least one negative power group Ln located closer to the image side than stop ST, on the optical path between reflection surfaces RL1 and RL2 of two reflection prisms P1 and P2. By increasing an angle formed between the principal ray at each angle of view and optical axis AX in negative power group Ln, an incident position of a light flux at each angle of view can be separated from the other on the incident surface of power group Lp located closest to incident surface S2a of second prism P2, which makes aberration correction easy.

Lens system LN preferably has a power arrangement of positive, negative and positive in an area between first and second prisms P1 and P2. A positive power group arranged around the outgoing surface of first prism P1 is effective to correct chromatic aberration generated in first prism P1. Further, the positive power group can reduce an angle formed between a light flux and optical axis AX to prevent increase of the effective diameter on an optical member located closer to the object side than the positive power group. On the other hand, positive power group Lp located around incident surface S2a of second prism P2 is effective for reducing the thickness of second prism P2 as described above. The negative power group arranged between the two power groups with positive power is effective for correcting distortion and curvature of flea When a power group with positive power is arranged at a position closer to the object side than stop ST, in lens system LN arranged between first and second prisms P1 and P2, there can be provided a structure which can correct distortion and coma excellently. When plural positive lenses are arranged in front of stop ST, correction of chromatic aberration generated in first prism P1 and correction of distortion and coma can be distributed to respective lenses, which is effective to enhance the optical performance.

Incident surface S1a of first prism P1 is preferably has concaved surface shape toward the object side. When incident surface S1a of first prism P1 has negative power, an angle formed between a light flux and optical axis AX in first prism P1 can be reduced, which enables to make first prism P1 compact.

Negative power group Ln located closer to the image side than stop ST preferably satisfies the following conditional expression (3).

$$0.5 < |f\_1n/f\_1p| < 1.5 \tag{3}$$

In the expression, f_1n is a focal length of the negative power group located closer to the image side than the stop, and f_1p is a focal length of the power group closest to the incident surface of the second prism.

The conditional expression (3) provides a conditional range which relates to a power ratio of the above-described negative power group Ln and positive power group Lp. When the value becomes below the lower limit of the conditional expression (3), the effective diameter in the positive power group is enlarged and the thickness of the entire optical structure becomes large. Inversely, when the value exceeds the upper limit of the conditional expression (3), the power of negative power group Ln becomes weak and light fluxes at respective angles of view are superimposed with each other within the effective diameter of positive power group Lp, which is disadvantageous in aberration correction. Further, from the view point of optical performance, when the value below the lower limit of the conditional expression (3), negative power becomes strong, which makes correction of curvature of field difficult. Inversely, when the value exceeds the upper limit of the conditional expression (3), positive power becomes strong, which makes correction of distortion and coma difficult.

As described above, positive power group Lp which is located next to and in front of second prism P2 and is provided as the power group, preferably includes at least one positive lens satisfying the following conditional expression (4).

$$0.56 < nd\_1p/nd\_p2 < 0.97 \tag{4}$$

In the expression, nd_1p is a refractive index of the positive lens and nd_p2 is a refractive index of a prism material forming a reflection surface of the second prism.

The conditional expression (4) provides a preferable conditional range which relates to the refractive index of second prism P2. By providing high refractive index to second prism P2 so as to satisfy the conditional expression (4), the equivalent surface distance of second prism P2 is reduced and downsizing the entire optical structure can be aimed. When the value exceeds the upper limit of the conditional expression (4), the refractive index of second prism is lowered and the equivalent surface distance of second prism P2 is enlarged, which makes ensuring the back focal length difficult. Inversely, when the value becomes lower than the lower limit of the conditional expression (4), the refractive index of a positive lens in positive power group Lp is lowered. It increases the curvature of a positive power surface in positive power group Lp and makes correction of chromatic aberration difficult.

As described above, positive power group Lp which is located next to and in front of second prism P2 and is provided as the power group, preferably includes at least one positive lens satisfying the following conditional expression (5).

$$1.1 < vd\_1p/vd\_p2 < 4 \quad (5)$$

In the expression, vd_1p is an Abbe number of the positive lens and vd_p2 is an Abbe number of a prism material forming a reflection surface of the second prism.

The conditional expression (5) provides a preferable conditional range which relates to the Abbe number (namely, dispersion) of second prism P2. By satisfying the conditional expression (5), chromatic aberration generated in second prism P2 can be corrected in a good condition. When the value becomes below than the lower limit of the conditional expression (5), chromatic aberration generated in second prism P2 is hardly corrected. When the value exceeds the upper limit of the conditional expression (5), the chromatic aberration generated in second prism P2 is excessively corrected and chromatic aberration on the image plane is deteriorated.

It is preferable that at least one optical member arranged on the optical path between two reflection surfaces RL1 and RL2 is driven in a focusing process. For example, it is preferable that at least one optical member to be driven in a focusing process is arranged on the optical path between the two reflection prisms P1 and P2. Alternatively, it is preferable that one or plural lens elements arranged on the optical path between the two reflection prisms P1 and P2 are driven in a focusing process. When there is provided a structure that an optical member (such as a lens element and optical filter) is mechanically shifted on the optical path between two reflection surfaces RL1 and RL2 in a focusing process, the focusing process can be carried out without changing the thickness of the entire optical structure. A structure that a reflection prism is moved in a focusing process and a structure that the entire optical structure including the reflection prisms is driven in the focusing process, will apply a burden on the driven mechanism for moving the reflection prism with great mass. Accordingly, they are not preferable because a problem such as enlarging a motor used for the driving process is arisen.

As an optical member which is driven in a focusing process, a variable-focus lens such as a liquid lens (for example, an liquid optical element described in JP-A No. 2005-292763) may be used. A liquid lens is an element wherein a boundary of two kinds of liquid which are not mixed together (for example, water and oil) is deformed by electric control and the power is changed by the resulting curvature change. The focus can be adjusted by driving such a variable-focus lens. Even in such the case, the variable-focus lens is preferably arranged on the optical path between the two prism-reflection surfaces RL1 and RL2 or the optical path between two reflection prisms P1 and P2. When a variable-focus lens is used, mechanical driving is not required in a focusing operation and a drive device for a lens element is not needed. Therefore, it enables to simplify the structure and it enables to make image pickup optical device OU and digital equipment DU compact.

It is preferable to move plural optical members arranged on the optical path between two prism reflection surfaces RL1 and RL2 in a focusing process. For example, it is preferable to move plural optical members arranged on the optical path between two reflection prisms P1 and P2 in a focusing process. By providing such the structure, change of optical performance corresponding to the focusing can be reduced.

At least one of two reflection prisms P1 and P2 is preferably formed of a glass material. When the material of the prism is a resin material, a material with high refractive index can be used. An increased refractive index enables to reduce the equivalent surface distance, which achieves effectively compactness of the optical structure. A glass material has an advantage that birefringence, which causes a problem in a resin material, is small, and can realize excellent optical performance. Further, by forming the prism with a glass molding method, an image pickup optical system which easily reduces aberrations on a refraction surface can be realized.

It is preferable that at least one of two reflection prism P1 and P2 is formed of a resin material. By using a resin material for the material of the prism, a reflection prism having a power on a surface can be easily produced.

It is preferable that image pickup optical system OP employs a thermal resin (a resin material with small refractive index change caused by temperature change) as an optical material forming reflection prisms P1 and P2 and lens elements in lens system LN. A resin material has a large refractive index change caused when temperature changes, and has a problem that a change of environmental temperature affects the resin material and its properties changes. However, it has been known recently that mixing inorganic particles into a resin material can reduce the influence of the temperature change on the material. Generally, when microparticles are mixed in the transparent resin material, light is scattered and the transmission factor is lowered. So, such the material is difficult to use as the optical material. However, the microparticles whose size is smaller than the wavelength of the transmitting light flux prevent the scattering sufficiently.

Hereupon, the refractive index of a resin material is lowered when the temperature rises, while the refractive index of inorganic microparticles is increased when the temperature rises. Accordingly, the refractive index change can be almost prevented by using those temperature dependencies such that they interact each other to be canceled out. Concretely, when inorganic particles whose size is 20 nanometers or less are dispersed in resin as base material, it can provide a resin material wherein temperature dependency of the refractive index is extremely low. For example, when microparticles of niobium oxide ($Nb_2O_5$) are dispersed in acryl resin, refractive index change caused by temperature change can be reduced. By using such a resin material in which inorganic particles are dispersed as a material of an optical element such as a reflection prism, the property change caused when the temperature changes can be controlled to be small.

Next, refractive index change A due to temperature will be explained in detail as follows. The refractive index change A due to temperature is expressed by the following expression (FA) by differentiating a refractive index "n" with respect to temperature "t", based on the Lorentz-Lorenz equation.

[Math. 1]

$$A = \frac{(n^2+2)(n^2-1)}{6n}\left\{(-3\alpha) + \frac{1}{[R]}\frac{\partial[R]}{\partial t}\right\} \quad \text{(FA)}$$

In the expression (FA), α represents the coefficient of linear expansion, and [R] represents molecular refraction.

In the cases of resin materials, a contribution of the second term is generally smaller than that of the first term in the expression (FA), and it can be mostly neglected. For example, in the case of PMMA (polymethyl methacrylate) resins, coefficient of linear expansion α is $7\times10^{-5}$. When it is substituted in the aforesaid expression (FA), A=$-1.2\times10^{-4}$ [/° C.] holds to almost agree with actual measurements. Specifically, it is desirable that the refractive index change A due to temperature which has been about $-1.2\times10^{-4}$ is controlled to be less than $8\times10^{-5}$ in an absolute value. Further, it is more preferable that the value is controlled to be less than $6\times10^{-5}$ in an absolute value.

At least one of two reflection prisms P1 and P2 are preferably formed of a composite material. By using a composite material for a prism material, aberration correction using a difference of material properties can be carried out It is preferable that at least one of prisms P1 and P2 includes a prism section formed of a glass material and a lens section forming a power surface out of a resin material on an optical surface of the prism section. In other words, it is preferable that at least one refraction prism is formed of a composite material such that power surface made of a resin material is formed on an optical surface of a glass prism material. By forming a reflection prism out of such the composite material, a degree of freedom of selecting the prism material increases, which is preferable. It allows using a prism material with high refractive index and an equivalent surface distance can be reduced. Therefore, reducing the size of the optical structure can be achieved effectively. Further, since birefringence which is caused when a resin material is used can be reduced, excellent optical performance can be achieved. The above complex structure can be obtained, for example, by forming a lens section out of ultraviolet curing resin on a glass prism section (for example, first and second prisms P1 and P2 in Example 3 which will be described later). By employing such a producing method, a reflection prism with power can be obtained easily, which is preferable in view of mass production.

When each of reflection prisms P1 and P2 is formed by a prism section formed of a glass material and a lens section forming a power surface out of a resin material on an optical surface of the prism section, optical properties of the prism section and the lens section generally differ from each other. Therefore, in the above conditional expressions (4) and (5), conditions are set for the refractive index and Abbe number of the prism material forming refraction surface RL2 of second prism P2, in order to obtain an effect relating to a reduction of the equivalent surface distance in the prism section and correction of chromatic aberration caused in the prism section.

It is preferable that a filter for cutting infrared ray on the optical path between two prism reflection surfaces RL1 and RL2. For example, it is preferable that image pickup optical system OP includes a filter for cutting infrared ray on the optical path between two prisms P1 and P2. By preparing such the structure, the thickness of image pickup optical system OP can be more reduced in comparison with the case that a filter for cutting infrared ray is arranged at a position between the outgoing surface of second prism P2 and image plane IM.

When a CCD imaging sensor or CMOS imaging sensor is used as image pickup element SR, an infrared-ray component sometimes makes noise and deteriorates an inputted image. Therefore, there has been taken an action that an infrared-cut filter is arranged at a required position in image pickup optical system so that the infrared-ray component does not enter image pickup element SR, conventionally. In image pickup optical system. OP including two reflection prisms P1 and P2, it is preferable that an infrared-cut filter is arranged on the optical path between first prism P1 and second prism P2, which enables to avoid the thickness of image pickup optical system from increasing corresponding to the filter arrangement.

It is preferable that any one of two reflections prisms P1 and P2 includes an infrared-cut function for reducing the infrared-ray component contained in the incident light. To provide the infrared-cut function, an infrared-cut coating may be deposited on the incident surface or outgoing surface of the prism, or a material absorbing an infrared ray may be used for the material of the prism itself. By providing the infrared-cut function to the reflection prism, an additional space for arranging an infrared-cut filter is not required, which realizes a compactness of the entire optical structure or reduction of the number of parts.

Next, a concrete optical structure of image pickup optical system OP will be described in more detail, with referring the first to fifth embodiments. FIGS. 1 to 5 show optical construction diagrams showing the first to fifth embodiments of image pickup optical systems OP under the condition that the focus is adjusted to infinity by using an optical sectional view under the condition that the optical path is unbent FIGS. 6 to 10 show optical construction diagrams showing the first to fifth embodiments of image pickup optical systems OP under the condition that the focus is adjusted to infinity with an optical sectional view under the condition that the optical path is bent. Each of FIGS. 1 to 5 shows, in order from the side close to optical axis AX, off-axis light fluxes which reach the position of image plane IM at the maximum height in the shorter side direction of the image area, the maximum height in the longer side direction of the image area, and the maximum height in the diagonal direction of the image area, respectively. FIGS. 6 to 10 show off-axis light fluxes which reach the position of image plane IM at the maximum height in the shorter side direction of the image area.

Image pickup optical system OP in each embodiment is a unifocal lens forming optical image IM on image pickup element SR (in FIG. 21), and is composed of first and second prisms P1 and P2 each for bending the incident light at an almost right angle, and lens system LN with positive power arranged between the prisms. It forms a light-bending optical system that two reflection prisms P1 and P2 are arranged to bend optical axis AX twice along a virtual plane (for example, a sheet surface of each of FIGS. 6 to 10).

First prism P1 is composed of prism section P1*b* and lens section P1*a* jointed to the surface facing the object side of prism section P1*b*, and lens section P1*c* jointed to the surface facing the image side of prism section P1*b*. The incident surface of first prism P1 has a concaved surface shape toward the object side. Second prism P2 is composed of prism section P2*b* and lens section P2*a* jointed to the surface facing the object side of prism section P2b, and lens section P1c jointed to the surface facing the image side of prism section P2b. The incident surface of first prism P2 has a concaved surface shape toward the object side.

Lens system LN includes two or three positive lenses and one negative lens. A positive power group is formed by at least one positive lens, and a negative power group is formed by one negative lens. As a power group arranged next to the outgoing surface of first prism P1, a positive power group is arranged. As a power group arranged next to the incident surface of second prism P2, a positive power group is arranged. Then, a negative power group is arranged between the two positive power groups. A focusing process from an infinity object to a near object is carried out by moving at least one power group toward the object side, as shown by using arrow mF in FIGS. 1 to 5.

Lens system LN of the first embodiment (FIGS. 1 and 6) is composed of, in order from the object side, stop ST, a positive power group composed of first lens L1 (biconvex positive lens), a negative power group composed of second lens L2 (biconcave negative lens), a positive power group composed of third lens L3 (biconvex positive lens), and infrared-cut filter FR.

Lens system LN of the first embodiment (FIGS. 2 and 7) is composed of, in order from the object side, stop ST, a positive power group composed of first lens L1 (biconvex positive lens), a negative power group composed of second lens L2 (biconcave negative lens), and a positive power group composed of third lens L3 (biconvex positive lens). Though an infrared-cut filter FR is not arranged, an infrared-cut function may be provided by depositing an infrared-cut coating on the incident surface or outgoing surface of the prism, or by using a material absorbing an infrared ray for the prism material itself.

Lens system LN of the third embodiment (FIGS. 3 and 8) is composed of, in order from the object side, stop ST, a positive power group composed of first lens L1 (biconvex positive lens), a negative power group composed of second lens L2 (biconcave negative lens), a positive power group composed of third lens U (biconvex positive lens), and infrared-cut filter FR.

Lens system LN of the fourth embodiment (FIGS. 4 and 9) is composed of, in order from the object side, a positive power group composed of first lens L1 (positive meniscus lens with a convex surface facing the object side) and second lens L2 (biconvex positive lens), stop ST, a negative power group composed of third lens L3 (negative meniscus lens with a concave surface facing the object side), a positive power group composed of fourth lens L4 (biconvex positive lens), and infrared-cut filter FR.

Lens system LN of the fifth embodiment (FIGS. 5 and 10) is composed of; in order from the object side, a positive power group composed of first lens L1 (positive meniscus lens with a convex surface facing the object side) and second lens L2 (biconvex positive lens), stop ST, a negative power group composed of third lens L3 (negative meniscus lens with a concave surface facing the image side), a positive power group composed of third lens L4 (biconvex positive lens), and infrared-cut filter FR.

EXAMPLES

Structures of image pickup optical systems obtained by carrying out the present invention will be described more concretely with referring construction data of Examples. Examples 1 to 5 which will be cited are numerical examples corresponding to the above first to fifth embodiments, respectively. The optical structure diagrams (FIGS. 1 to 10) representing the first to fifth embodiments show corresponding lens constructions of Examples 1 to 5.

Construction data of each example show, in order from the left-hand side, surface number, curvature radius "r" (mm), surface distance on the optical axis "d" (mm), refractive index "nd" for the d line (wavelength: 587.56 nm), and Abbe number "vd" for the d line as SURFACE DATA. The surface number followed by an asterisk "*" represents an aspheric surface (refractive optical surface in aspheric shape or a surface with a refractive action equivalent to an aspheric surface), and its surface form is defined by the following expression (AS) employing a local Cartesian coordinate system (x, y, z) whose origin is at the surface apex. Aspheric surface coefficients are given as ASPHERIC SURFACE DATA. In the aspheric surface data of each example, a blank represents a coefficient of zero, and E−n=×10$^{-n}$ holds for each data $$z=(c\cdot h^2)/[1+\sqrt{\{1-(1+K)\cdot c^2\cdot h^2\}}]+\Sigma(Aj\cdot j^j) \quad (AS)$$

In the expression, h is a height from the z-axis (optical axis AX) in the perpendicular direction (where $h^2=x^2+y^2$), z is a sag amount at height h in the direction of optical axis AX (the reference is the surface apex), c is a curvature at the surface apex (a reciprocal of curvature radius r), K is a conic constant, and Aj (where j=4, 6, 8, 10) is the j-th-order aspheric surface coefficient.

As VARIOUS DATA, focal length (f, mm), F number (Fno.), half angle of view (ω, °), image height (y'max, mm), total lens length (TL, mm), and back focal length (BF, mm) will be shown. The F number, half angle of view and back focal length are effective values for the total lens length at the object distance (d0=∞). The back focal length is represented by the distance from the rearmost lens surface to the paraxial image plane in an air equivalent length. The total lens length is obtained by adding the back focal length to the distance from the forefront lens surface to the rearmost lens surface. As FOCUS DATA, variable distances which vary corresponding to a focusing operation (in other words, an axial surface distances at the condition that the focus is adjusted to infinity (d0=∞) and the condition that the focus is adjusted to a close distance (d0=100 mm)). Further, Table 1 shows values of the Example corresponding to the conditional expressions.

FIGS. 11 to 20 are aberration diagrams of Examples 1 to 5. FIGS. 11 to 15 show various aberrations of Examples 1 to 5 under the condition that the focus is adjusted to infinity (d0=∞). FIGS. 16 to 20 show various aberrations of Examples 1 to 5 under the condition that the focus is adjusted to a close distance (d0=100 mm). Each of FIGS. 11 to 20 show, from the left-hand side, a spherical aberration diagram (LONGITUDINAL SPHERICAL ABER.), an astigmatism diagram (ASTIGMATIC FIELD CURVES), and distortion diagram (DISTORTION). The spherical aberration diagram shows a spherical aberration amount for the d-line (wavelength: 587.56 nm) represented by a solid line, a spherical aberration amount for the C-line (wavelength: 656.28 nm) represented by a short-dashed line, and a spherical aberration amount for the g-line (wavelength: 435.84 nm) represented by a long-dashed line, where each spherical aberration amount is represented by a shift amount (unit: mm, scale of horizontal axis: −0.200 to 0.200 mm) from the paraxial image plane in the direction of optical axis AX. The vertical axis of each diagram shows a value of the entering height to the pupil which is normalized by the maximum height (namely, relative pupil height). Astigmatism diagram shows a tangential image plane for the d-line by dashed line Y and a sagittal image plane for the d-line by solid line X, by using a shift amount (unit: mm, scale of horizontal axis: −0.200 to 0.200 mm) from the paraxial image plane in the direction of optical axis AX. The vertical axis of the diagram shows the image height (IMG HT, unit: mm).

In the distortion diagram, the horizontal axis shows distortion for the d-line (unit: %, scale of horizontal axis: −5.0 to 5.0%), and the vertical axis shows the image height (IMG HT, unit: mm). The maximum value of image height IMG HT corresponds to maximum image height y'max on image plane IM (the half diagonal length of light-receiving surface SS of image pickup element SS).

Example 1

Unit: mm
Surface Data
Surface No. r d nd vd
Object plane ∞ d0
1*−5.117 0.000 1.525 56.45
2 ∞ 3.433 1.525 56.45
3 ∞ 0.298 1.525 56.45
4*−9.386 0.112
5(stop) ∞ 0.500
6 3.500 1.330 1.531 49.33
7 −5.000 0.787
8*−4.857 0.600 1.607 27.10
9*4.054 d9
10*9.611 1.975 1.532 56.57
11*−3.418 0.050
12 ∞ 0.300 1.517 64.17
13 ∞ d13
14*−18.247 0.100 1.607 27.10
15 ∞ 3.418 1.607 27.10
16* 6.016 0.400
17 ∞ 0.100 1.517 64.17
18 ∞ 0.100
Image plane ∞
Aspheric Surface Data
1st surface
K=0.0
A4=3.4946E−03
A6=−9.8255E−05
A8=3.3987E−06
A10=9.6167E−08
4th surface
K=0.0
A4=4.4700E−03
A6=1.7029E−04
A8=−3.1054E−05
A10=3.5086E−05
8th surface
K=0.0
A4=−1.3095E−02
A6=3.3028E−04
A8=0.0000E+00
A10=0.0000E+00
9th surface
K=0.0
A4=−9.4446E−03
A6=8.5964E−04
A8=0.0000E+00
A10=0.0000E+00
10th surface
K=0.0
A4=8.3207E−04
A6=4.7273E−05
A8=8.9464E−06
A10=−1.7525E−06
11th surface
K=0.0
A4=−1.3020E−04
A6=6.7620E−04
A8=−6.9850E−06
A10=−7.4777E−07
14th surface
K=0.0
A4=−9.1262E−03
A6=5.7247E−04
A8=−2.0648E−05
A10=−6.1550E−06
16th surface
K=0.0
A4=−6.9941E−03
A6=0.0000E+00
A8=0.0000E+00
A10=0.0000E+00
Various Data
f 5.901
Fno. 3.000
ω 29.658
y'max 3.360
TL 15.109
BF 0.560
Focus Data
d0 ∞ 100.000
d9 0.752 0.500
d13 0.894 1.147

Example 2

Unit: mm
Surface Data
Surface No. rd nd vd
Object plane ∞ d0
1*−7.934 0.000 1.768 49.23
2 ∞ 3.620 1.768 49.23
3 ∞ 0.355 1.768 49.23
4*−10.540 0.805
5(stop) ∞ d5
6 4.349 1.012 1.815 43.33
7 −20.408 0.750
8 −8.931 0.600 1.804 24.32
9 5.412 0.700
10*6.647 1.584 1.525 56.45
11*−4.709 d11
12*−14.256 0.100 1.607 27.60
13 ∞ 3.384 1.607 27.60
14*6.813 0.400
15 ∞ 0.100 1.517 64.17
16 ∞ 0.100
Image plane ∞
Aspheric Surface Data
1st surface
K=0.0
A4=9.0280E−04
A6=2.3895E−05
A8=−4.7532E−06
A10=3.3500E−07
4th surface
K=0.0
A4=1.3480E−03
A6=−1.0479E−04

A8=2.9829E−05
A10=−1.9600E−06
10th surface
K=0.0
A4=1.3224E−04
A6=3.6821E−04
A8=1.2316E−05
A10=−1.2100E−05
11th surface
K=0.0
A4=2.7992E−03
A6=3.7041E−04
A8=1.3723E−04
A10=−2.6100E−05
12th surface
K=0.0
A4=−6.7420E−03
A6=2.7071E−04
A8=2.2032E−05
A10=−1.6200E−05
14th surface
K=0.0
A4=−5.8922E−03
A6=0.0000E+00
A8=0.0000E+00
A10=0.0000E+00
Various Data
f 5.900
Fno. 3.000
ω 29.661
y'max 3.360
TL 15.199
BF 0.550
Focus Data
d0 ∞ 100.000
d5 0.745 0.500
d11 0.995 1.240

Example 3

Unit: mm
Surface Data
Surface No. rd nd vd
Object plane ∞ d0
1*−5.934 0.000 1.525 56.45
2 ∞ 3.389 1.849 33.11
3 ∞ 0.255 1.525 56.45
4*−13.149 0.313
5(stop) ∞ 0.500
6 3.885 1.060 1.701 47.99
7 −11.520 0.741
8*−11.141 0.600 1.607 27.10
9*3.524 d9
10*7.519 1.884 1.525 56.45
11*−3.727 0.050
12 ∞ 0.300 1.517 64.17
13 ∞ d13
14* −11.880 0.100 1.583 29.90
15 ∞ 3.398 1.850 40.00
16 ∞ 0.100 1.583 29.90
17*6.263 0.400
18 ∞ 0.100 1.517 64.17
19 ∞ 0.100
Image plane ∞
Aspheric Surface Data
1st surface
K=0.0
A4=3.4627E−03
A6=−1.0819E−04
A8=5.6463E−07
A1.6782E−07
4th surface
K=0.0
A4=4.0674E−03
A6=−7.0872E−04
A8=3.4454E−04
A10=−6.1112E−05
8th surface
K=0.0
A4=−1.0957E−02
A6=6.9421E−04
A8=0.0000E+00
A10=0.0000E+00
9th surface
K=0.0
A4=−8.7710E−03
A6=8.9598E−04
A8=0.0000E+00
A10=0.0000E+00
10th surface
K=0.0
A4=7.5247E−04
A6=5.8420E−05
A8=1.4003E−05
A10=−5.9029E−06
11th surface
K=0.0
A4=2.1554E−03
A6=2.6520E−04
A8=6.4542E−05
A10=−1.2244E−05
14th surface
K=0.0
A4=−6.6764E−03
A6=3.6403E−04
A8=8.3826E−06
A10=−1.0961E−05
17th surface
K=0.0
A4=−7.4111E−03
A6=0.0000E+00
A8=0.0000E+00
A10=0.0000E+00
Various Data
f 5.900
Fno. 3.000
ω 29.661
y'max 3.360
TL 14.986
BF 0.556
Focus Data
d0 ∞ 100.000
d9 0.809 0.564
d13 0.930 1.175

Example 4

Unit: mm
Surface Data
Surface No. rd nd vd
Object plane ∞ d0
1*−8.928 0.000 1.754 51.60
2 ∞ 4.196 1.754 51.60
3 ∞ 0.500 1.754 51.60

4*29.147 0.100
5 5.151 0.584 1.847 23.80
6 5.807 0.200
7 3.332 1.000 1.651 55.93
8*-31.867 0.150
9(stop) ∞ 1.290
10*-2.757 0.600 1.847 23.80
11*-6.547 d11
12*4.731 2.168 1.487 70.40
13*-3.148 0.050
14 ∞ 0.300 1.517 64.17
15 ∞ d15
16*-5.680 0.100 1.682 54.42
17 ∞ 3.364 1.682 54.42
18*5.610 0.400
19 ∞ 0.100 1.517 64.17
20 ∞ 0.100
Image plane ∞
Aspheric Surface Data
1st surface
K=0.0
A4=32352E-03
A6=-1.2253E-04
A8=4.4719E-06
A10=-6.8483E-08
4th surface
K=0.0
A4=4.4952E-03
A6=5.7967E-05
A8=6.9903E-06
A10=6.4427E-06
8th surface
K=0.0
A4=-2.4011E-03
A6=2.7807E-05
A8=-8.3182E-05
A10=1.9177E-05
10th surface
K=0.0
A4=2.4555E-02
A6=-4.2439E-03
A8=0.0000E+00
A10=0.0000E+00
11th surface
K=0.0
A4=1.7981E-02
A6=-2.0334E-03
A8=0.0000E+00
A10=0.0000E+00
12th surface
K=0.0
A4=-7.0179E-03
A6=7.4670E-04
A8=-7.7546E-06
A10=0.0000E+00
13th surface
K=0.0
A4=5.5182E-03
A6=4.8806E-04
A8=3.5935E-05
A10=5.0591E-06
16th surface
K=0.0
A4=-1.7693E-03
A6=9.8615E-04
A8=-7.5299E-05
A10=-1.2959E-07

18th surface
K=0.0
A4=-8.2257E-03
A6=3.6133E-04
A8=9.3060E-05
A10=-4.6862E-06
Various Data
f 6.200
Fno. 3.000
ω 28.455
y'max 3.360
TL 17.308
BF 0.559
Focus Data
d0 ∞ 100.000
d11 1.125 0.941
d15 1.022 1.206

Example 5

Unit: mm
Surface Data
Surface No. rd nd vd
Object plane ∞ d0
1*-9.371 0.000 1.525 56.45
2 ∞ 5.190 1.525 56.45
3 ∞ 0.500 1.525 56.45
4*2.813 0.452
5 4.222 2.000 1.783 24.61
6 5.169 0.200
7 3.009 1.311 1.532 56.57
8*-3.383 0.150
9(stop) ∞ 0.838
10*65.418 0.600 1.607 27.10
11*2.604 d11
12*4.863 1.872 1.532 56.57
13*-4236 0.050
14 ∞ 0.30 1.517 64.17
15 ∞ d15
16*-166.541 0.663 1.607 27.10
17 ∞ 3.383 1.607 27.10
18*6.103 0.400
19 ∞ 0.100 1.517 64.17
20 ∞ 0.126
Image plane ∞
Aspheric Surface Data
1st surface
K=0.0
A4=2.4038E-03
A6=-9.6979E-05
A8=2.9376E-06
A10=-4.8813E-08
4th surface
K=0.0
A4=5.3244E-03
A6=-6.6668E-05
A8=6.9887E-05
A10=-1.4599E-05
8th surface
K=0.0
A4=1.4750E-02
A6=-3.2415E-03
A8=1.1006E-03
A10=-1.8811E-04
10th surface
K=0.0
A4=-7.5633E-03

A6=−4.5409E−03
A8=0.0000E+00
A10=0.0000E+00
11th surface
K=0.0
A4=−2.4244E−02
A6=1.8499E−04
A8=0.0000E+00
A10=0.0000E+00
12th surface
K=0.0
A4=−2.7218E−03
A6=4.1767E−04
A8=−7.1888E−05
A10=3.9475E−06
13th surface
K=0.0
A4=9.1236E−04
A6=−8.9090E−06
A8=−3.3174E−06
A10=−1.8336E−07
16th surface
K=0.0
A4=−5.5126E−03
A6=−5.3005E−05
A8=−2.6405E−05
A10=−2.5136E−06
18th surface
K=0.0
A4=−6.3172E−03
A6=−4.6837E−05
A8=0.0000E+00
A10=0.0000E+00
Various Data
f 4.650
Fno. 3.000
ω 35.851
y'max 3.360
TL 19.708
BF 0.589
Focus Data
d0 ∞ 100.000
d11 0.680 0.500
d15 0.931 1.111

TABLE 1

|  | EXAMPLE 1 | EXAMPLE 2 | EXAMPLE 3 | EXAMPLE 4 | EXAMPLE 5 |
|---|---|---|---|---|---|
| Related data |  |  |  |  |  |
| f | 5.90 | 5.90 | 5.90 | 6.20 | 4.65 |
| fp2 | −6.91 | −7.15 | −6.62 | −3.68 | −9.61 |
| f_1p | 4.85 | 5.51 | 5.04 | 4.27 | 4.58 |
| f_1n | −3.19 | −4.12 | −4.34 | −6.06 | −4.48 |
| nd_1p | 1.532 | 1.525 | 1.525 | 1.487 | 1.532 |
| nd_p2 | 1.607 | 1.607 | 1.850 | 1.682 | 1.607 |
| vd_1p | 56.57 | 56.45 | 56.45 | 70.40 | 56.57 |
| vd_p2 | 27.10 | 27.60 | 40.00 | 54.41 | 27.10 |
| Conditional expression |  |  |  |  |  |
| (1) fp2/f | −1.70 | −1.21 | −1.12 | −0.59 | −2.07 |
| (2) \|f_1p/fp2\| | 0.70 | 0.77 | 0.76 | 1.16 | 0.48 |
| (3) \|f_1n/f1p\| | 0.66 | 0.75 | 0.86 | 1.42 | 0.98 |
| (4) nd_1p/nd_p2 | 0.95 | 0.95 | 0.82 | 0.88 | 0.95 |
| (5) vd_1p/vd_p2 | 2.09 | 2.05 | 1.41 | 1.29 | 2.09 |

Citation List

| CITATION LIST | |
|---|---|
| DU | Digital equipment with image input function |
| OU | Image pickup optical device |
| OP | Image pickup optical system |
| P1 | First prism (Reflection prism) |
| P2 | Second prism (Reflection prism) |
| RL1 | Reflection surface |
| RL2 | Reflection surface |
| LN | Lens system |
| Lp | Positive power group |
| Ln | Negative power group |
| ST | Stop |
| SR | Image pickup element |
| SS | Light-receiving surface |
| IM | Image plane (Optical image) |
| AX | Optical axis |
| 1 | Signal processing section |
| 2 | Control section |
| 3 | Memory |
| 4 | Operating section |
| 5 | Display section |

The invention claimed is:

1. An image pickup optical system for forming an optical image of an object onto a light-receiving surface of an image pickup element, the image pickup optical system comprising:
    two reflection prisms for bending incident light at an almost right angle, wherein when a reflection prism located at an object side along an optical path is a first prism and a reflection prism located at an image side along the optical path is a second prism, an optical axis at an incident surface of the first prism and the optical axis at an outgoing surface of the second prism are almost parallel with each other; and
    a lens element forming at least one power group on an optical path between the two reflection prisms, wherein a power group closest to an incident surface of the second prism is a positive power group and the incident surface of the second prism has a concaved surface shape facing the object side,
    wherein the image pickup optical system satisfies the conditional expressions (1) and (2):

$$-4.2 < fp2/f < -0.2 \tag{1}$$

$$0.2 < |f\_1p/fp2| < 1.5 \tag{2}$$

where fp2 is a focal length of the second prism,
    f is a focal length of an entire of the image pickup optical system, and
    f_1p is a focal length of the power group closest to the incident surface of the second prism.

2. The image pickup optical system of claim 1, further comprising, on the optical path between reflection surfaces of the two reflection prisms,
    a stop and
    at least one negative power group located closer to the image side than the stop.

3. The image pickup optical system of claim 2, satisfying the following conditional expression (3):

$$0.5 < |f\_1n/f\_1p| < 1.5 \tag{3}$$

where f_1n is a focal length of the negative power group located closer to the image side than the stop.

4. The image pickup optical system of claim 1,
    wherein the positive power group comprises at least one positive lens satisfying the following conditional expression (4):

$$0.56 < nd\_1p/nd\_p2 < 0.97 \tag{4}$$

where nd_1p is a refractive index of the positive lens and nd_p2 is a refractive index of a prism material forming a reflection surface of the second prism.

5. The image pickup optical system of claim 1,
wherein the positive power group comprises at least one positive lens satisfying the following conditional expression (5):

$$1.1 < vd\_1p/vd\_p2 < 4 \qquad (5)$$

where vd_1p is an Abbe number of the positive lens and vd_p2 is an Abbe number of a prism material forming a reflection surface of the second prism.

6. The image pickup optical system of claim 1, comprising at least one optical member on the optical path between the two reflection prisms, for being driven in a focusing process.

7. The image pickup optical system of claim 1, comprising a plurality of optical members on the optical path between the two reflection prisms, for being moved in a focusing process.

8. The image pickup optical system of claim 1,
wherein at least one of the two reflection prisms comprises a glass material.

9. The image pickup optical system of claim 1,
wherein at least one of the two reflection prisms comprises a resin material.

10. The image pickup optical system of claim 1,
wherein at least one of the two reflection prisms comprises a composite material.

11. The image pickup optical system of claim 1,
wherein at least one of the two reflection prisms comprises a prism section comprising a glass material and a lens section forming a power surface with a resin material on an optical surface of the prism section.

12. The image pickup optical system of claim 1, further comprising an infrared-cut filter on the optical path between the two reflection prisms.

13. The image pickup optical system of claim 1,
wherein at least one of the two reflection prisms comprises an infrared-cut function for reducing a component of an infrared ray included in incident light.

14. An image pickup optical device comprising:
the image pickup optical system of claim 1; and
an image pickup element for converting an optical image formed on the light-receiving surface into electric signal.

15. A digital equipment comprising
the image pickup optical device of claim 14 by which at least one of functions of shooting a still image of a subject and of shooting a movie of the subject.

* * * * *